US009984055B2

(12) United States Patent
Aikawa

(10) Patent No.: US 9,984,055 B2
(45) Date of Patent: May 29, 2018

(54) IMAGE DISPLAY APPARATUS, NON-TRANSITORY COMPUTER-READABLE STORAGE MEDIUM AND DISPLAY CONTROL METHOD

(71) Applicant: KONICA MINOLTA, INC., Chiyoda-ku, Tokyo (JP)

(72) Inventor: Masafumi Aikawa, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 444 days.

(21) Appl. No.: 14/301,086

(22) Filed: Jun. 10, 2014

(65) Prior Publication Data

US 2014/0372881 A1 Dec. 18, 2014

(30) Foreign Application Priority Data

Jun. 17, 2013 (JP) ................................ 2013-126422

(51) Int. Cl.
*G06F 17/00* (2006.01)
*G06F 17/24* (2006.01)
*G06F 3/0488* (2013.01)

(52) U.S. Cl.
CPC ............ *G06F 17/24* (2013.01); *G06F 3/0488* (2013.01); *G06F 3/04883* (2013.01); *G06F 17/242* (2013.01)

(58) Field of Classification Search
CPC .............................. G06F 17/241; G06F 17/242
(Continued)

(56) References Cited

U.S. PATENT DOCUMENTS

2006/0029296 A1* 2/2006 King ...................... G06K 9/228
382/313
2010/0278453 A1* 11/2010 King ...................... G06Q 10/10
382/321
(Continued)

FOREIGN PATENT DOCUMENTS

JP 05257633 A 10/1993
JP 2003308065 A 10/2003
(Continued)

OTHER PUBLICATIONS

Japanese Office Action (and English translation thereof) dated May 8, 2015, issued in counterpart Japanese Application No. 2013-126422.

*Primary Examiner* — Stephen Hong
*Assistant Examiner* — Gregory Vaughn
(74) *Attorney, Agent, or Firm* — Holtz, Holtz & Volek PC

(57) ABSTRACT

Provided are a non-transitory computer-readable storage medium storing a display control program, an image display apparatus and a display control method. The apparatus includes a touch panel configured to receive a handwriting input and display a document and handwriting information in a display area thereof. The display control program, when being executed by a processor of the apparatus, causes the processor to perform the following processes. The processes includes: operating the touch panel to display a document and handwriting information in the display area; and in response to detecting an operation onto the document, controlling display of the handwriting information by using a first display mode or a second display mode. The first display mode is a mode to display the handwriting information with being associated with the document. The second display mode is a mode to display the handwriting information with being associated with the display area.

19 Claims, 27 Drawing Sheets

(58) Field of Classification Search
USPC .................. 715/200, 230, 232, 255, 268
See application file for complete search history.

(56) References Cited

U.S. PATENT DOCUMENTS

| | | | | |
|---|---|---|---|---|
| 2010/0325527 | A1* | 12/2010 | Estrada | G06F 17/241 715/230 |
| 2011/0029443 | A1* | 2/2011 | King | G06K 9/228 705/310 |
| 2011/0085211 | A1* | 4/2011 | King | H04N 1/0036 358/474 |
| 2011/0216015 | A1* | 9/2011 | Edwards | G06F 3/041 345/173 |
| 2011/0248941 | A1* | 10/2011 | Abdo | G06F 3/0488 345/173 |
| 2011/0265034 | A1* | 10/2011 | Garin | G06F 3/0425 715/810 |
| 2012/0254773 | A1* | 10/2012 | Viswanathan | G06F 3/0483 715/753 |
| 2012/0313865 | A1* | 12/2012 | Pearce | G06F 3/0416 345/173 |
| 2013/0014285 | A1* | 1/2013 | Sasakura | G06Q 50/01 726/29 |
| 2013/0021281 | A1* | 1/2013 | Tse | G06F 3/0425 345/173 |
| 2013/0054656 | A1* | 2/2013 | Conroy | G06F 1/1656 707/821 |
| 2013/0104028 | A1* | 4/2013 | Murray | G06F 15/0291 715/234 |

FOREIGN PATENT DOCUMENTS

| | | |
|---|---|---|
| JP | 2010015515 A | 1/2010 |
| JP | 2012173988 A | 9/2012 |

* cited by examiner

DISPLAY AREA

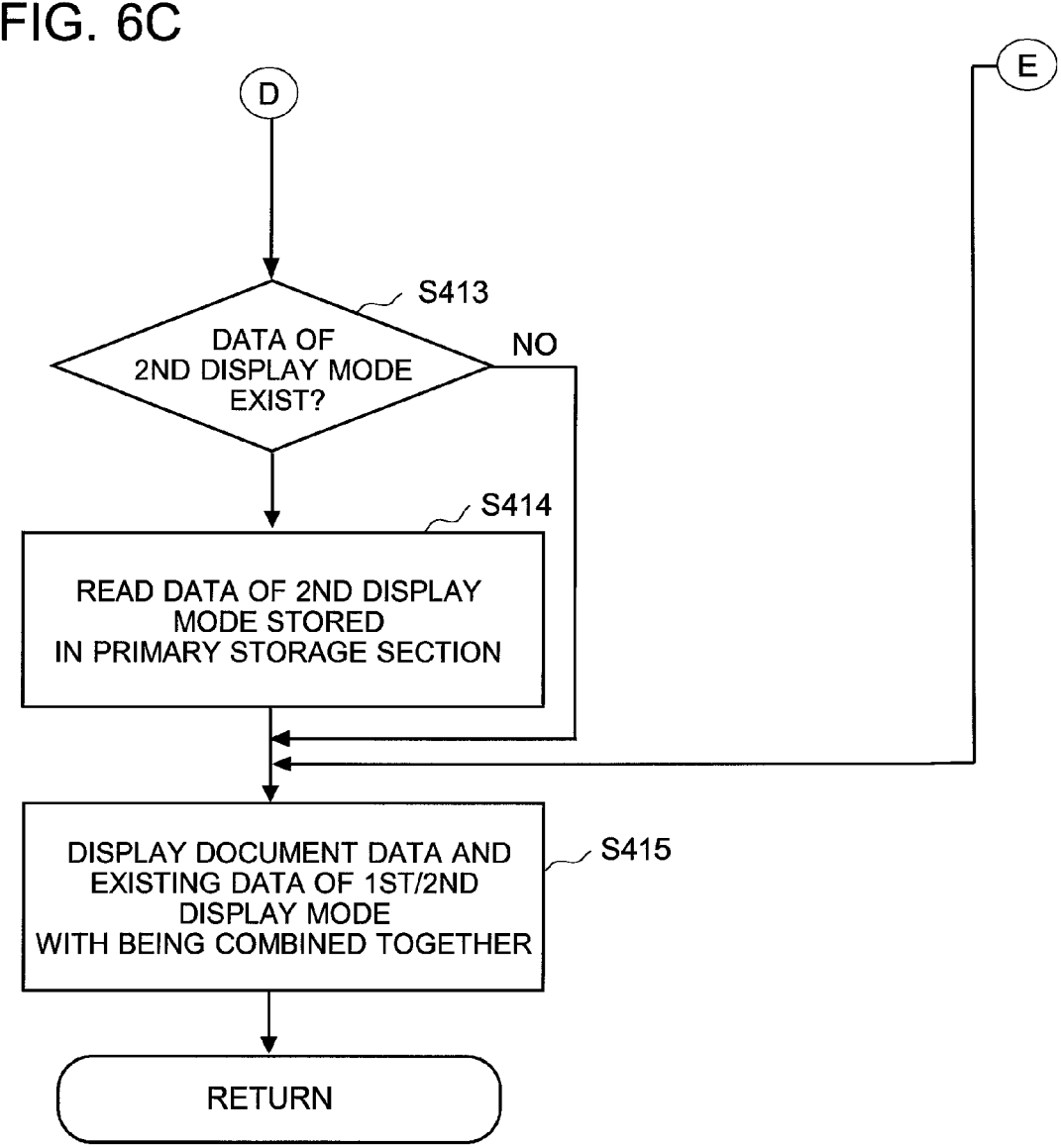

DOCUMENT ON FIRST LAYER

HANDWRITING INFORMATION ON THIRD LAYER

HANDWRITING INFORMATION
ON THIRD LAYER

DOCUMENT
ON FIRST LAYER

HANDWRITING INFORMATION
ON THIRD LAYER

REGION OF DOCUMENT TO BE COPIED INTO THIRD LAYER

DOCUMENT ON THIRD LAYER

FIG. 14C RELATED ART

KONICAMINOLTAMAN III

This is a Web drama on the theme of the essential value of Konica Minolta's services.
The story develops around three: Kusanagi, the protagonist of the story; Yamamoto, the boss of Kusanagi; and KONICAMINOLTAMAN. Kusanagi is a new employee of the company. In her school days, she kept good results in her studies and did everything neatly.

KONICAMINOLTAMAN III

This is a Web drama on the theme of the essential value of Konica Minolta's services.
The story develops around three: Kusanagi, the protagonist of the story; Yamamoto, the boss of Kusanagi; and KONICAMINOLTAMAN. Kusanagi is a new employee of the company. In her school days, she kept good results in her studies and did everything neatly.

— DOCUMENT

— HANDWRITING INFORMATION

DOCUMENT ON FIRST LAYER

DOCUMENT ON FIRST LAYER

HANDWRITING INFORMATION ON SECOND LAYER

DOCUMENT ON FIRST LAYER

DOCUMENT ON FIRST LAYER

HANDWRITING INFORMATION ON SECOND LAYER

IMAGE DISPLAY APPARATUS, NON-TRANSITORY COMPUTER-READABLE STORAGE MEDIUM AND DISPLAY CONTROL METHOD

This application is based on Japanese Patent Application No. 2013-126422 filed on Jun. 17, 2013, in the Japan Patent Office, the entire content of which is hereby incorporated by reference.

TECHNICAL FIELD

The present invention relates to an image display apparatus, a non-transitory computer-readable storage medium storing a display control program, and a display control method. In particular, the present invention relates to an image display apparatus configured to receive a handwriting input, a non-transitory computer-readable storage medium storing a display control program for controlling display of handwriting information, and a display control method for controlling the same.

BACKGROUND

In recent years, users reading or browsing documents by using an image display apparatus such as a tablet terminal and a smartphone have increased. On such an image display apparatus, a document having a plurality of pages can be displayed by switching pages one by one. In addition, on an image display apparatus equipped with a touch panel which accepts a handwriting input performed by a user, information (hereinafter, referred to as handwriting information) including characters and figures handwritten by a user can be displayed together with a document.

Regarding such an image display apparatus, for example, Japanese Laid-Open Patent Application Publication (JP-A) No. 2012-173988 discloses the following data processing apparatus. The image processing apparatus includes an input section configured to accept an input operation related to preparation of a document, a display section, and a processing section. The processing section has: a function for displaying a document under preparation on the display section; a function for displaying, when an operation for specifying reference data is accepted during preparation of the document, the specified reference data on the display section together with the document; a function for generating, when a predetermined operation is received in a situation that a document under preparation and reference data are displayed on the display section, linking information which associates a position in the document at which the most recent information is written in the document after the reference data is displayed with the reference data; and a function for storing a prepared document and the linking information in a predetermined storage device in association with each other. In addition, the input section is a tablet type input device and the predetermined operation is a writing operation on the input device by using predetermined input characteristics.

When such an image display apparatus is used to read or browse documents such as books, literatures, and medical records, a user often inputs additional information on the documents by handwriting for easy understanding. However, when a certain page of the document is turned with the handwriting information displayed together with the document, the image display apparatus once erases the page where the handwriting information is displayed from the screen to make an image of the next page on the screen, whereby the handwriting information disappears from the screen together with the certain page of the document.

To address this problem, such the image display apparatus can employ a method to store the data of the handwriting information in a storage, read out the stored data after turning a page of the document, put the handwriting information onto the document and then draw the document on the screen again. However, with this method, a reading operation and a process of the data are required every time when pages are turned, which creates a problem that time and effort are required.

As another method, the image display apparatus can employ a method to divide the screen thereof into some areas, and display the handwriting information in an area different from an area in which the document is displayed. However, because the size of the screen of the portable image display apparatus is small, when the small sized screen is divided into a plurality of areas, a problem arises that visibility of the document gets bad or it is difficult for users to perform handwriting input. The present invention seeks to solve the problem.

SUMMARY

There are disclosed illustrative non-transitory computer-readable storage media each storing a display control program, image display apparatuses and display control methods.

An illustrative non-transitory computer-readable storage medium reflecting one aspect of the present invention stores a display control program to be executed in an apparatus comprising a touch panel configured to receive a handwriting input and display a document together with handwriting information in a display area of the touch panel. The display control program, when being executed by a processor of the apparatus, causes the processor to perform the following processes. The processes comprises: operating the touch panel to display a document and handwriting information in the display area of the touch panel; and in response to detecting an operation onto the document displayed in the display area, controlling display of the handwriting information by using one of a first display mode and a second display mode. The first display mode is a mode to display the handwriting information with being associated with the document, and the second display mode is a mode to display the handwriting information with being associated with the display area.

An illustrative image display apparatus reflecting one aspect of the present invention is an image display apparatus comprising: a touch panel configured to receive a handwriting input and display a document together with handwriting information in a display area of the touch panel; and a control section configured to perform the above-described processes.

An illustrative display control method reflecting one aspect of the present invention is a display control method of a an apparatus comprising a touch panel configured to receive a handwriting input and display a document together with handwriting information in a display area of the touch panel. The method comprises: operating the touch panel to display a document and handwriting information in the display area of the touch panel; and in response to detecting an operation onto the document displayed in the display area, controlling display of the handwriting information by using one of a first display mode and a second display mode. The first display mode is a mode to display the handwriting information with being associated with the document, and the second display mode is a mode to display the handwriting information with being associated with the display area.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIGS. 6A to 6C illustrate a flowchart of a process (a drawing process of a document) on an image display apparatus according to an embodiment of the present invention;

FIGS. 14A to 14D are diagrams illustrating a display example of handwriting information on a conventional image display apparatus;

DETAILED DESCRIPTION

Illustrative embodiments of non-transitory computer-readable storage media each storing a display control program, image display apparatuses, and control methods will be described with reference to the drawings. It will be appreciated by those of ordinary skill in the art that the description given herein with respect to those figures is for exemplary purposes only and is not intended in any way to limit the scope of potential embodiments may be resolved by referring to the appended claims.

With image display apparatuses, non-transitory computer-readable storage media each storing a display control program, and display control methods as embodiments of the present invention, handwriting information can be appropriately displayed.

That is because such an image display apparatus is equipped with a touch panel capable of receiving handwriting input and displaying information, and when receiving an operation performed on the document under the condition that the document and handwriting information are displayed on the display area of the touch panel, the image display apparatus can control display of the handwriting information by using one of a first mode and a second mode, where the first display mode is a mode to display the handwriting information with being associated with the document and the second mode is a mode to display the handwriting information with being associated with the display area.

As described in the descriptions about the background, the image display apparatus such as a tablet terminal and a smartphone can display a document having a plurality of pages by switching pages one by one, and the image display apparatus equipped with a touch panel for accepting handwriting input can display handwriting information together with the document.

However, in the image display apparatus, when a user changes the pages from the currently displayed page to another page by using a page-turning button or the like, the image display apparatus once erases the currently displayed page from the screen to make an image of another page on the screen, whereby the handwriting information which has been inputted on the current page by handwriting also disappears from the screen.

Figure 14A:
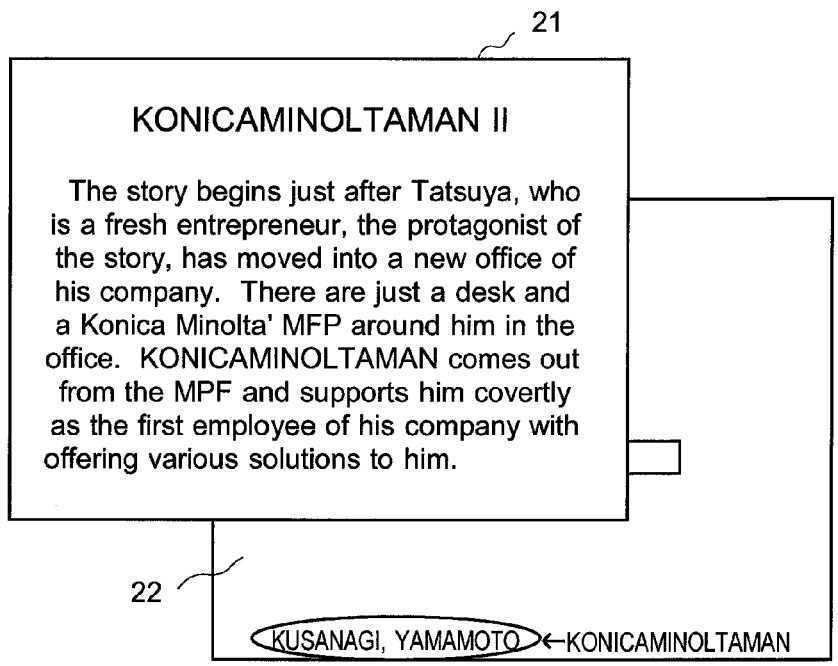
Figure 14B:
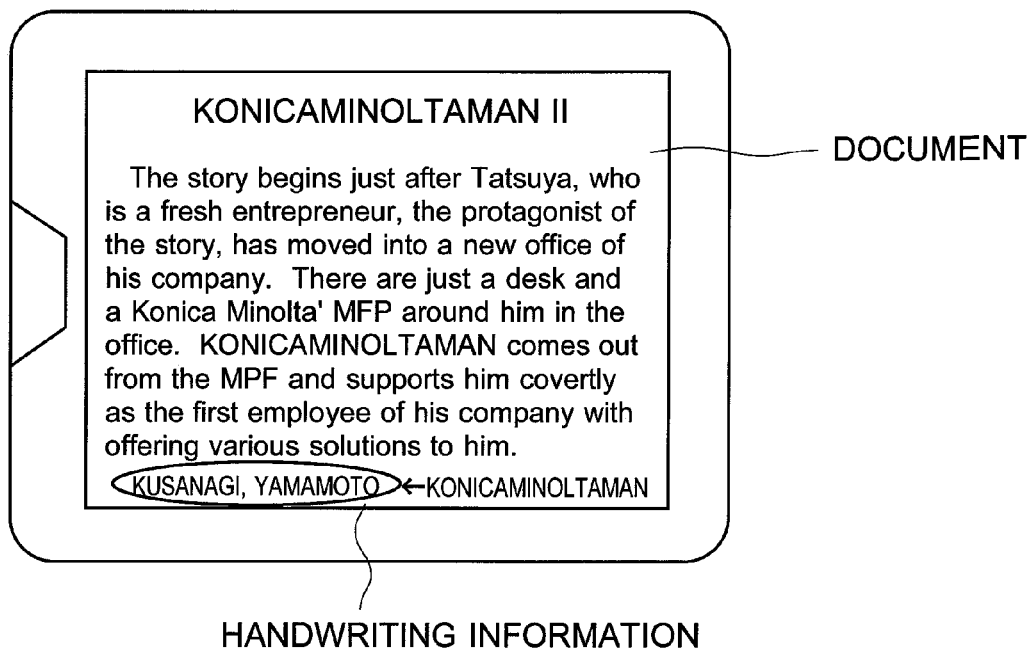

FIGS. 14A to 14D illustrate a display example of handwriting information on the conventional image display apparatus which allows a user to conduct handwriting input thereon. FIG. 14A illustrates a first layer 21 and a second layer 22 of a certain page (page "n"), and FIG. 14B illustrates an example of the page displayed on the conventional image display apparatus. FIG. 14C illustrates a first layer 21 and a second layer 22 of the next page (page "n+1"), and FIG. 14D illustrates an example of the next page displayed on the conventional image display apparatus. For example, as shown in FIG. 14B and FIG. 14D, the conventional image display apparatus is configured to combine a layer (the first layer 21 in FIGS. 14A and 14B) on which a document is drawn (on which an image of the document is made) and a layer (the second layer 22 in FIGS. 14A and 14B) on which handwriting information is drawn (on which an image of the handwriting information is made) together to display the combined image of the page. Thus, when a user moves from a certain page (page "n" illustrated in FIG. 14B) to another page (page "n+1" illustrated in FIG. 14D) on the screen, the image display apparatus updates the handwriting information in the screen together with the currently-displayed page of the document.

Figure 15A:
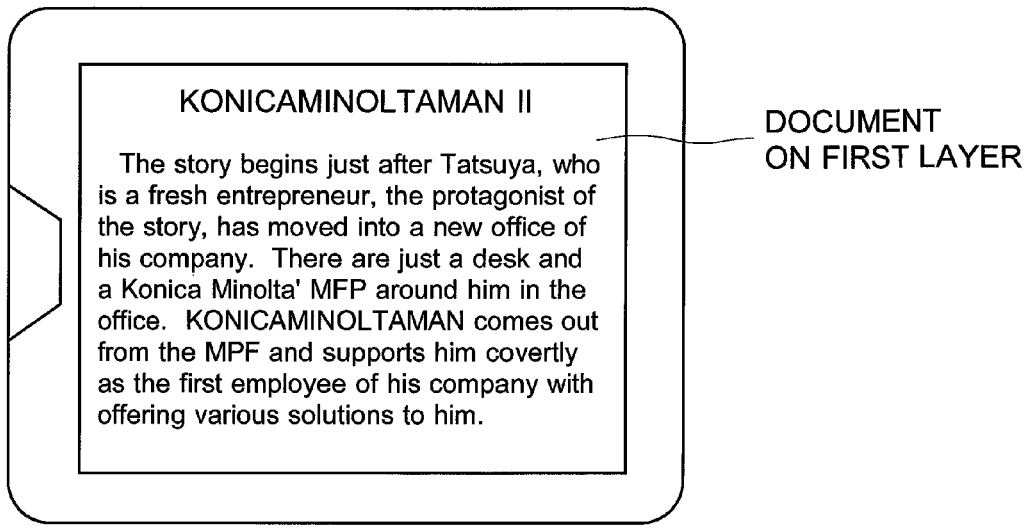
FIGS. 15A to 15E are diagrams illustrating another display example of handwriting information on a conventional image display apparatus.
Figure 15B:
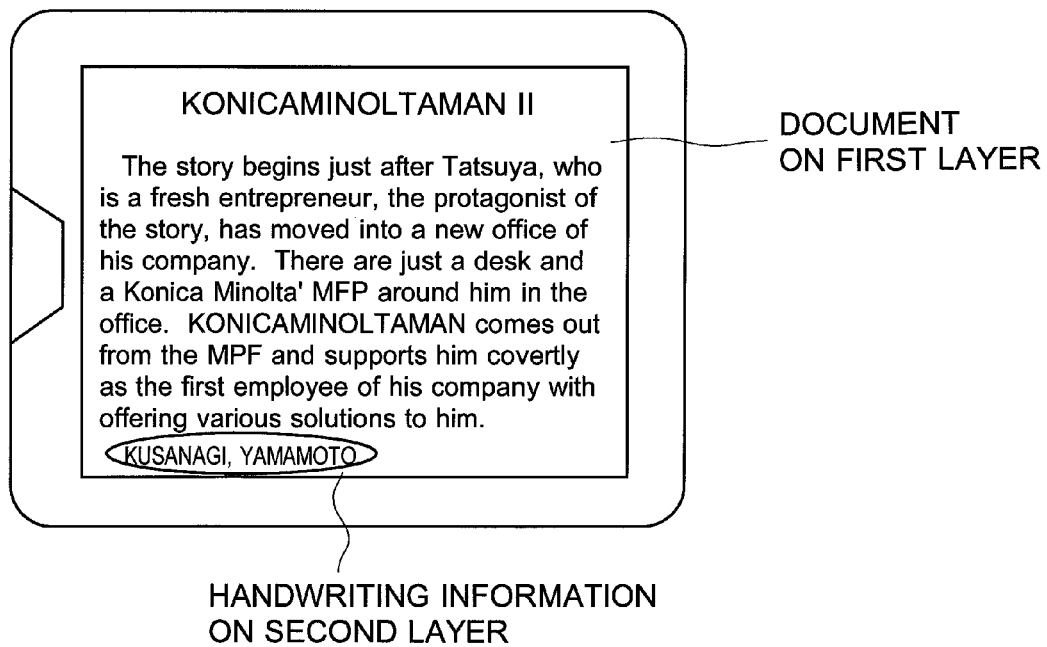
Figure 15C:
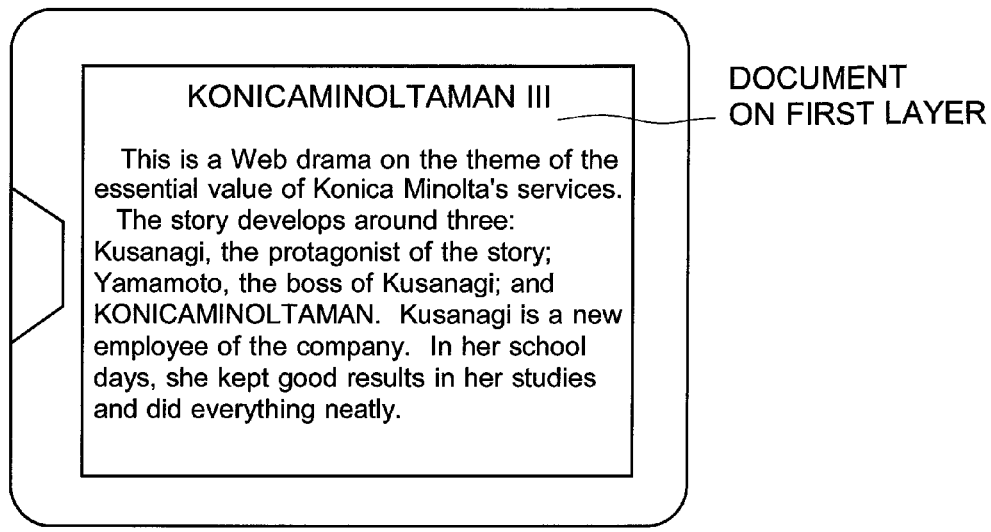
Figure 15D:
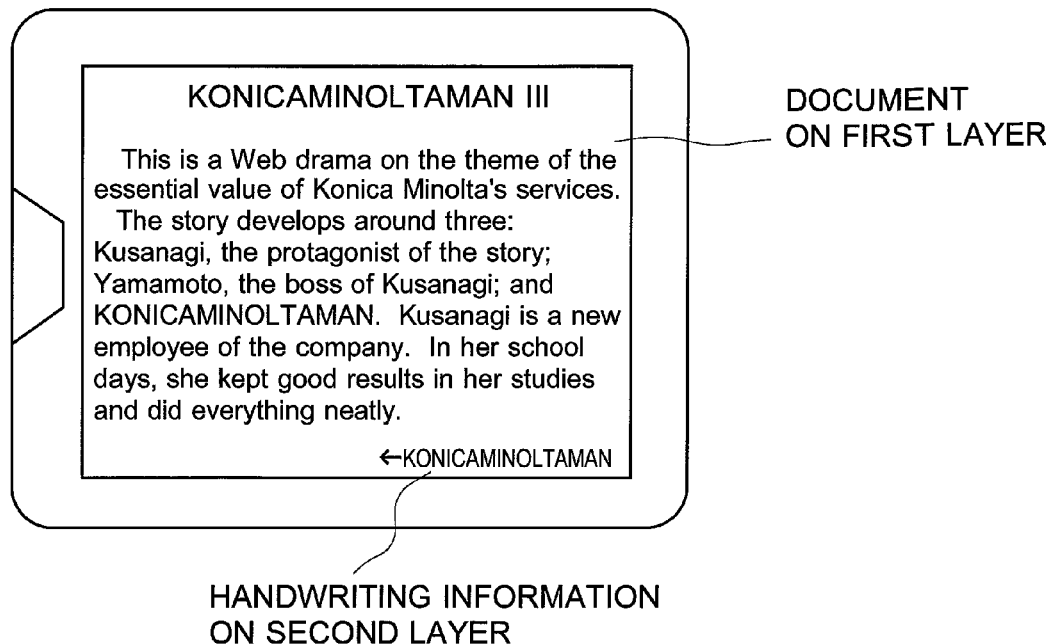
Figure 15E:
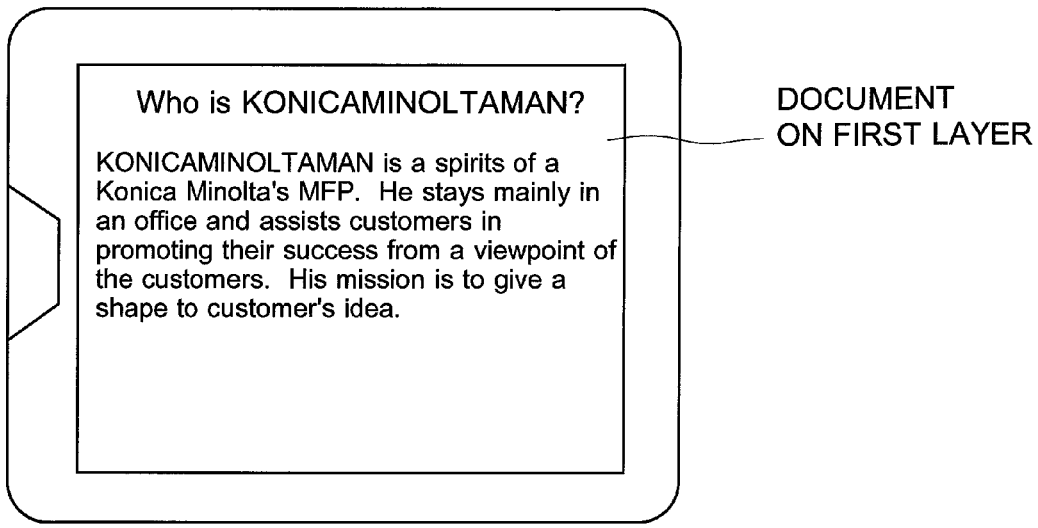

For a specific example, there is given a situation that, under the condition that an image display apparatus displays page "n" of a document (on the first layer) on the screen as illustrated in FIG. 15A, a user has inputted handwriting information (on the second layer) onto the page as illustrated in FIG. 15B. When the page is turned to page "n+1", the handwriting information inputted on page "n" is erased from the screen as illustrated in FIG. 15C. In a similar way, there is given another situation that handwriting information (on the second layer) has been inputted on page "n+1" as illustrated in FIG. 15D. When the page is turned to page "n+2", the handwriting information inputted on page "n+1" disappears from the screen as illustrated in FIG. 15E. In other words, a problem arises that a user cannot view the handwriting information, which has been inputted on a certain page, when viewing another page on the screen.

With respect to this problem, description will be made in reference to a specific example, on the assumption that a user is reading a novel on an image display apparatus. The novel usually describes, in the beginning part, introductions of settings and relationships of the characters. However, it is quite unusual that all of the settings and relationships of the characters are described on the first page of the beginning part of the novel; thus, the settings and the relationships of the characters sometimes confuse a reader as the reading of the novel progresses. In such a case, the reader has to turn the pages back to read again. Further, in the case of a novel as a physical book, a bookmark is used to show the pages the reader has read, and the reader can write the settings and the relationships of the characters on the bookmark.

On the other hand, in the case that a reader reads data of a novel by using a conventional image display apparatus capable of handwriting input, it is cumbersome to prepare a memo pad in addition to the image display apparatus and to write down the above-mentioned information in the memo pad. To address this issue, a reader can underline a phrase of the novel, add a marker and handwrite an idea coming to mind. However, as described above, because such handwriting information disappears when a page is turned, the reader has to turn pages back to the page on which the handwriting information has been added, to read again the handwriting information. However, in such the image display apparatus, it is difficult for a reader to find the desired page by turning a bunch of pages at a time as done with the novel as the physical book. Therefore, a mechanism to allow a reader to refer the handwriting information easily is desirable.

Figure 16A:
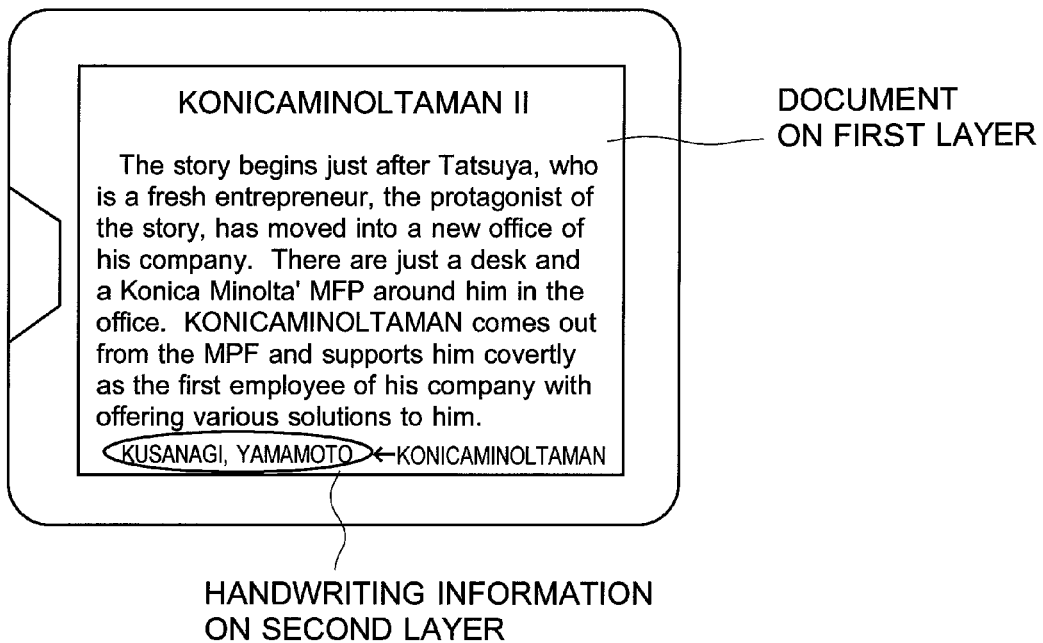
FIGS. 16A to 16D are diagrams illustrating another display example of handwriting information on a conventional image display apparatus.
Figure 16B:
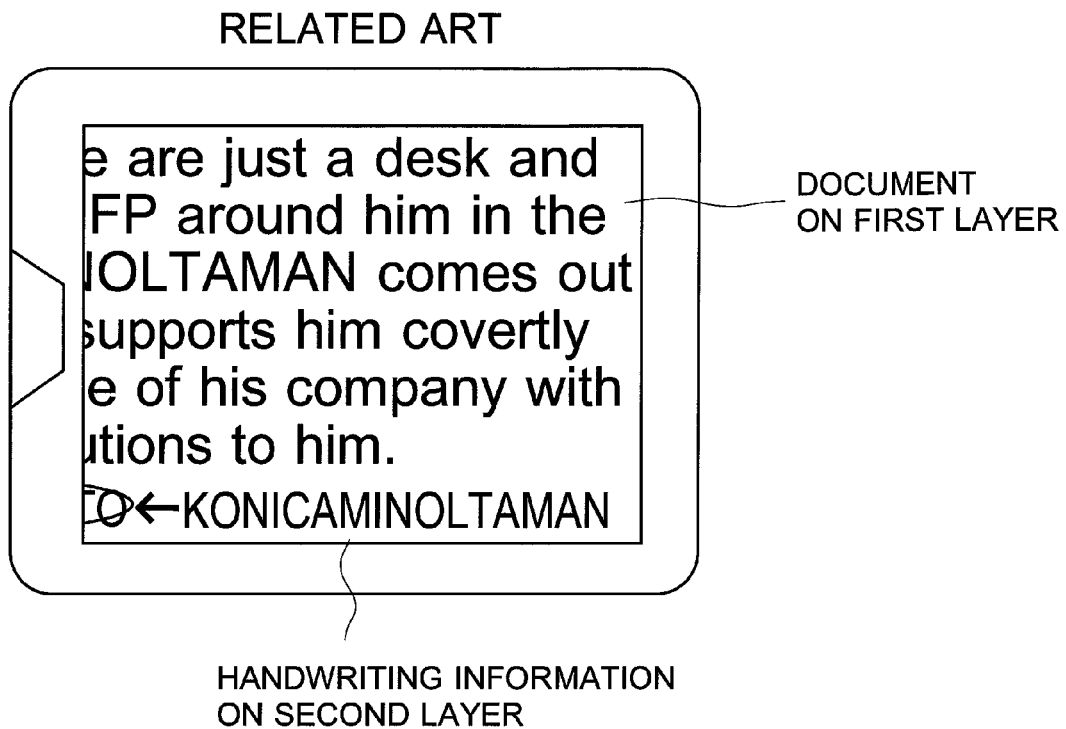
Figure 16C:
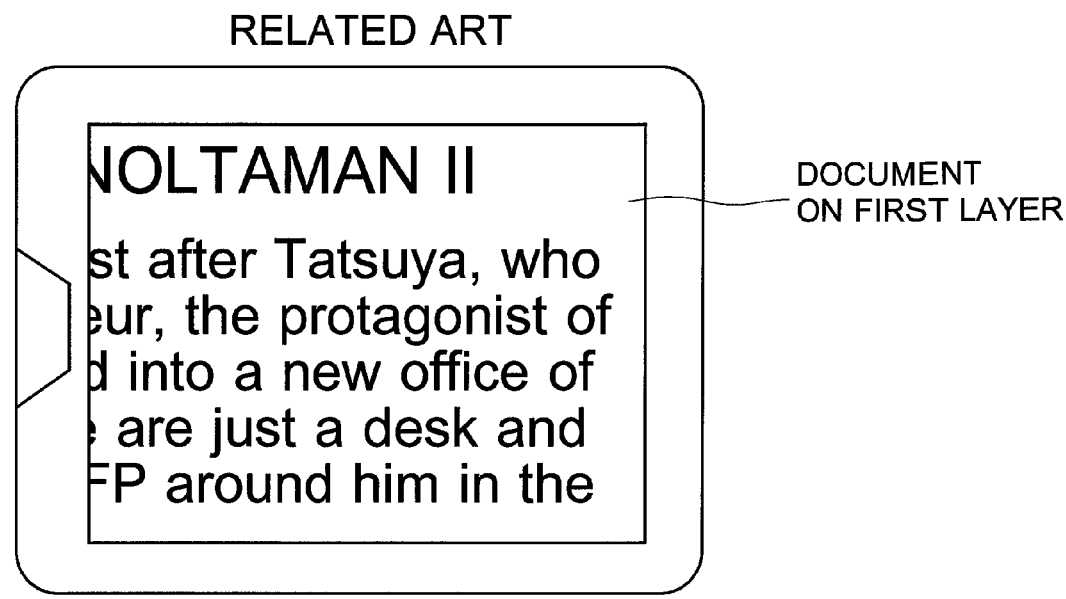
Figure 16D:
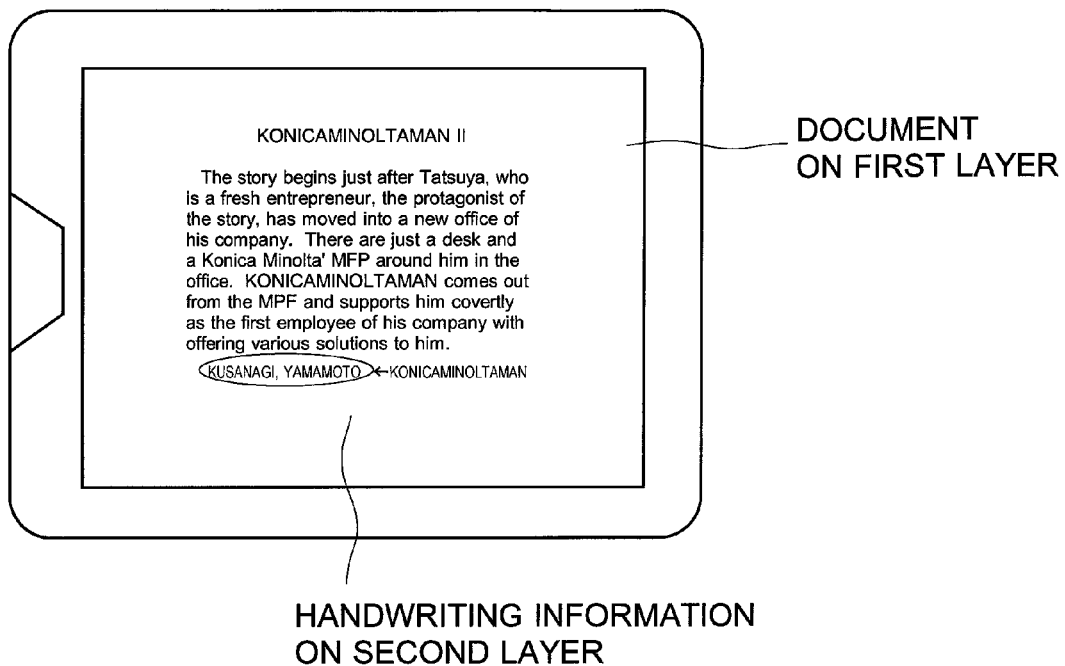

Further, with image display apparatuses, as illustrated in FIG. 16A, not only a document can be displayed on the entire display area, but the document can be enlarged (FIG. 16B and FIG. 16C) and reduced (FIG. 16C). However, with a conventional image display apparatuses, a document (on a first layer) and handwriting information (on a second layer) are associated with each other. Therefore, when the page is enlarged as illustrated in FIG. 16B, the handwriting information (on the second layer) is also enlarged at the same magnification ratio to the document, whereby, the handwriting information sometimes disturbs the reading of the document. Further, a reader moves to another place on the page (scrolls the screen) as illustrated in FIG. 16C while the page is displayed, the handwriting information disappears from the screen, whereby the reader hardly progresses reading the document while confirming the hardwiring information. Alternatively, when the page is reduced as illustrated in FIG. 16D, the handwriting information is reduced as the same magnification ratio to the document, which makes the reader difficult to read the hardwiring information.

To address these problems, the image display apparatus can employ a method to store data of the handwriting information in a storage, read out the stored data, and redraw the handwriting information after a page or pages are turned. However, with this method, a reading operation and a process of the data are required every time when a page or pages are turned, which causes a problem that time and efforts are required. Alternatively, the image display apparatus can employ another method to display the handwriting information in an area which is different from an area where the document is displayed. However, dividing a small-sized screen of a portable image display apparatus makes the visibility of the document worse and makes readers difficult to perform handwriting input.

In view of the above, an image display apparatus as an embodiment of the present invention, which is equipped with a touch panel configured to receive handwriting input so as to display a document together with handwriting information thereon, is configured to control display of the handwriting information as follows. There is prepared display modes of the handwriting information: a first display mode to display the handwriting information with being associated with the document (for example, an image of the document is made on a first layer and an image of the handwriting information is made on a second layer which changes together with the first layer), and a second display mode to display handwriting information without being associated with the document (for example, an image of the document is made on a first layer and an image of the handwriting information is made on a third layer which is fixed to the display area). Information to designate which of the display modes is to be used for the display of the handwriting information, has been previously added to each piece of handwriting information. When receiving an operation onto the document (for example, operations of turning out a page, scrolling a page, and enlarging or reducing a page), the image display apparatus displays each piece of handwriting information in the first display mode or the second display mode according to the previously-added designation information.

Accordingly, the handwriting information in the second display mode is displayed without being affected by operations such as turning out a page, scrolling a page, and enlarging or reducing a page, which allows a reader to utilize the handwriting information effectively.

EXAMPLES

Figure 1:
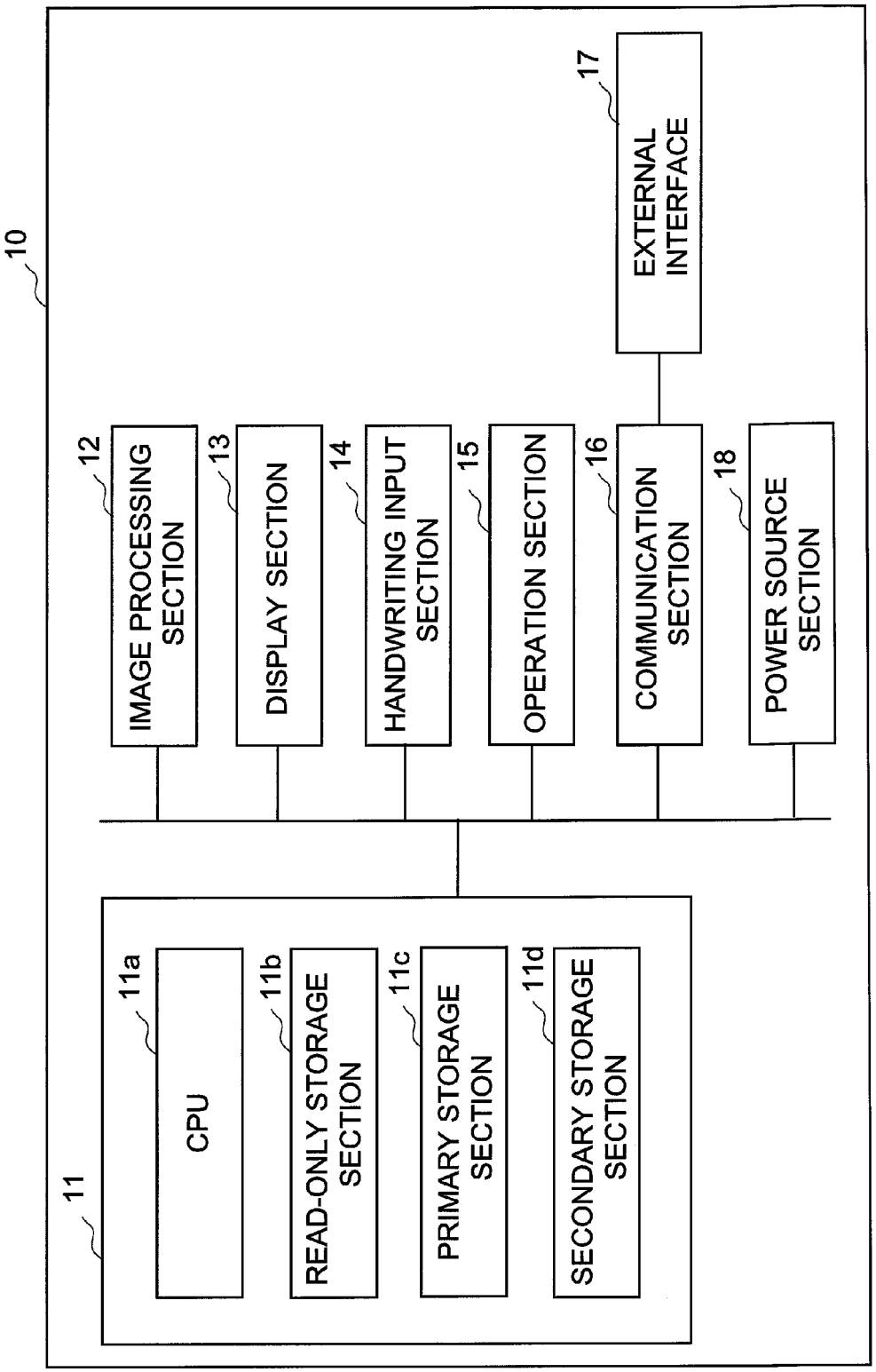
FIG. 1 is a block diagram illustrating a configuration of an image display apparatus according to an embodiment of the present invention.
Figure 2:
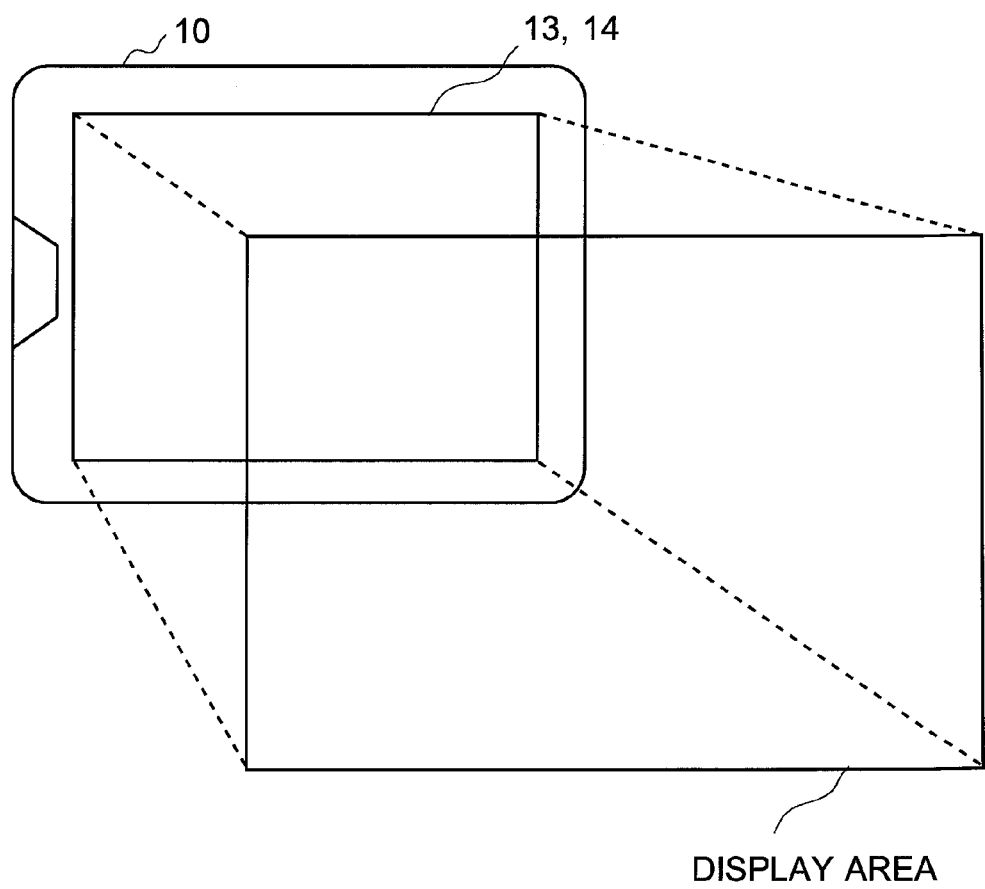
FIG. 2 is a diagram illustrating a display area of an image display apparatus according to an example of the embodiment invention.

In order to describe in detail the above-described embodiment of the present invention, an image display apparatus, a non-transitory computer-storage media storing a display control program, and a display control method according to an example of the present invention will be described with reference to FIG. 1 through FIG. 13C. FIG. 1 is a block diagram illustrating a configuration of the image display apparatus of the present embodiment, and FIG. 2 is a diagram illustrating a display area of the image display apparatus. Further, FIG. 3A through FIG. 8 are flowcharts for illustrating processes on the image display apparatus of the present example, and FIG. 9 through FIG. 13C are diagrams illustrating display examples of the handwriting information of image display apparatus of the present example.

The image display apparatus of the present example is a device equipped with a display function and a handwriting input function, such as a tablet terminal, a smartphone, and a computing device having a touch panel. The image display apparatus 10 is composed of, as illustrated in FIG. 1, a control section 11, an image processing section 12, a display section 13, a handwriting input section 14, an operation section 15, a communication section 16, an external interface 17 and a power source section 18.

The control section 11 includes a CPU (Central Processing Unit) 11a, a read-only storage section 11b, a primary storage section 11c and a secondary storage section 11d.

The CPU 11a is a device for executing a program stored in the read-only storage section 11b. The CPU 11a can receive data from an input device (for example, the handwriting input section 14), the secondary storage section 11d, or the like, perform a process such as operation and modification on the data, and then output the processed data to an output device (for example, the display section 13), the secondary storage section 11d, or the like.

The read-only storage section 11b is composed of, for example, a ROM (Read Only Memory) and the like, and stores a program, firmware, font data, data of basic graphics and the like which are necessary to start up the image display apparatus 10 and are rarely updated. Note that as the ROM 11b, can be used a memory in which written data cannot be rewritten, or can be used a flash memory in which data can be rewritten any number of times.

The primary storage section 11c is also called a main memory or a main storage device, and is composed of, for example, a RAM (Random Access Memory) and the like. The primary storage section 11c stores data (for example, the above program and firmware data, data generated by expanding the document, data of the handwriting information, and the like) which are to be sent and received at a high speed by the CPU 11a and the image processing section 12.

The secondary storage section 11d is a storage device for making up for short of storage capacity of the primary storage section 11c, is also called an auxiliary storage device. The secondary storage section 11d is composed of an HDD (Hard Disk Drive), a flash memory, an SSD (Solid State Drive), an SD (Secure Digital) card, and the like. The secondary storage section 11d stores document data, data of the handwriting information, and the like. In FIG. 1, the secondary storage section 11d is provided inside the image display apparatus 10; however the secondary storage section 11d may be externally provided, and communication may be performed with the secondary storage section 11d to input/output data through the communication section 16 and the external interface 17 by cable communication or wireless communication.

The CPU 11a is configured to control whole of the image display apparatus 10 by developing in the primary storage section 11c the program stored in the read-only storage section 11b and executing the program. In particular, in the present example, the CPU 11a controls display of handwriting information by executing the display control program stored in the read-only storage section 11b, as follows. Specifically, as the display mode for the handwriting information, the CPU 11a prepares the first display mode in which the handwriting information is displayed in association with the document and the second display mode in which the handwriting information is displayed not in association with the document. The CPU 11a adds information to the data of each piece of handwriting information, where the added information (hereinafter, referred to as designation information) is information for designating which display mode to be used for displaying the handwriting information. Then, when an operation (for example, an operation such as page turning, scrolling, and enlargement or reduction) is performed on the document, the CPU 11a operates the image processing section 12 to generate screen information so that each piece of handwriting information is displayed in the display mode which is designated by the designation information, and operates the display section 13 to display the document and the handwriting information based on the screen information. Further, in the first display mode, when the user handwrites a box or frame for designating a part of the document and/or the handwriting information, the CPU 11a extracts a part of the document and/or the handwriting information inside or outside the region designated by the box or frame, and adds the designation information to them so that the extracted part is displayed in the second display mode.

The image processing section 12 is a device for executing processing of modification and generation of an image for the control section 11 to improve an operation speed, reduce a power consumption, and reduce a mounting area. The image processing section 12 is equipped with an input and an output, inputs handwriting information handwritten by a user from the handwriting input section 14, and converts, when the handwriting information is identified to be a character, the handwriting information into an appropriate character by using font data stored in the read-only storage section 11b. Or, the image processing section 12 converts a curved line handwritten by a user into a straight line or a smooth curved line or adjusts the size, the thickness, and the density. In particular, in the present example, according to the instruction from the control section 11, the image processing section 12 draws each page of the document (makes an image of each page of the document) onto the first layer, draws the handwriting information (makes an image of the handwriting information) designated to be displayed in the first display mode, onto the second layer associated with the first layer, and draws the handwriting information (makes an image of the handwriting information) designated to be displayed in the second display mode, onto the third layer not associated with the first layer. Then, the image processing section 12 generates screen information by overlapping the first layer, the second layer and the third layer together.

The display section 13 is configured to display, according to the screen information obtained from the control section 11 (or the image processing section 12), a general image and picture such as a character, a numerical value, a figure, information on an operation state of the device in the display area illustrated in FIG. 2. Examples of a display method include a microcapsule electrophoresis type, an electron powder fluid type, a liquid crystal type, an electro-wetting type, and a chemical change type. Among them, in the case of the liquid crystal type, each pixel is used as a dot, it is easy to partially change the display in real time; however, if types other than the liquid crystal type are used, it is difficult to change a part of the displayed image, and as a result there arises a restriction that after erasing the currently displayed page, drawing needs to be performed again according to the screen information obtained from the control section 11 (or the image processing section 12).

In the above-mentioned microcapsule electrophoresis type, charged white particles and black particles are put in transparent microcapsules together with oil, and the particles are moved due to the strength level of electricity to display. In the electron powder fluid type, display is performed by applying electricity to material having high fluidity which is made by subjecting fine particles to a special processing, so as to change the degree of density. In the liquid crystal type, multicolor display is performed by using cholesteric liquid crystal layers and the like which selectively reflect light having different wavelengths. In the electro-wetting type, display is performed by applying electricity to water and colored oil so that the water and the oil are solved or repel due to the strength level of the electricity. The chemical change type utilizes a redox reaction of organic material or inorganic material, and display is performed by developing a color by using electricity or heat.

The handwriting input section 14 is a device for allowing a user to input handwriting information, and is composed of, for example, a touch sensor formed by arranging transparent electrodes in matrix on the display section 13. The handwriting input section 14 is configured to detect the touch of user' hand or finger, a stylus pen, or the like, and output a moving locus of a touch position as handwriting information to the control section 11. The touch sensor may be a pressure sensitive type for sensing a pressure, a capacitance type for sensing a static electricity, or an electromagnetic type for sensing magnetism of a magnet or the like built in a pen.

The operation section 15 is a hardware switch such as a switch and a button for instructing setting and density adjustment of the image display apparatus 10, page turning, display of enlargement or reduction, data processing, and the like, and is configured to output signals depending on the operation of the hardware switch to the control section 11. Note that, to ensure space-saving, a software switch such as an icon to be used on the handwriting input section 14 may be used instead of a hardware switch or together with a hardware switch.

The communication section 16 is a device for managing a protocol for communicating with an external device. The communication section 16 is configured to, on connecting and communicating with another image display apparatus or another device through the external interface 17, perform software processing including modifying data with respect to the format, order and size, so as to make the data suitable to the device to communicate with.

The external interface 17 is connected to other image display apparatuses or other devices to communicate by cable communication or wireless communication.

The power source section 18 is a device for supplying electricity to the image display apparatus 10, and any type such as a battery type and a cable connection type can be used. Further, it can be possible to perform power management such that when a user does not operate for a certain period, all or a part of the supply of electricity is stopped.

Note that, FIG. 1 is an example of an image display apparatus 10 of the present example, and the configuration and the control thereof can be appropriately modified. In FIG. 1, for example, configuration is made such that the image processing section 12 is provided in addition to the control section 11 so that the image processing section 12 generates the screen information; however, a display control program executed on the control section 11 may be made to have the function of the image processing section 12, and in such case the image processing section 12 does not have to be provided.

A display control method using image display apparatus 10 of the present example will be described below. The CPU 11*a* executes processes illustrated in flowcharts of FIG. 3A through FIG. 7 by reading the display control program from the ROM 11*b* and executing the display control program. Note that in the following description, document data have previously been read in by the communication section 16 through the external interface 17, and are stored in the secondary storage section 11*d*.

Figure 4:
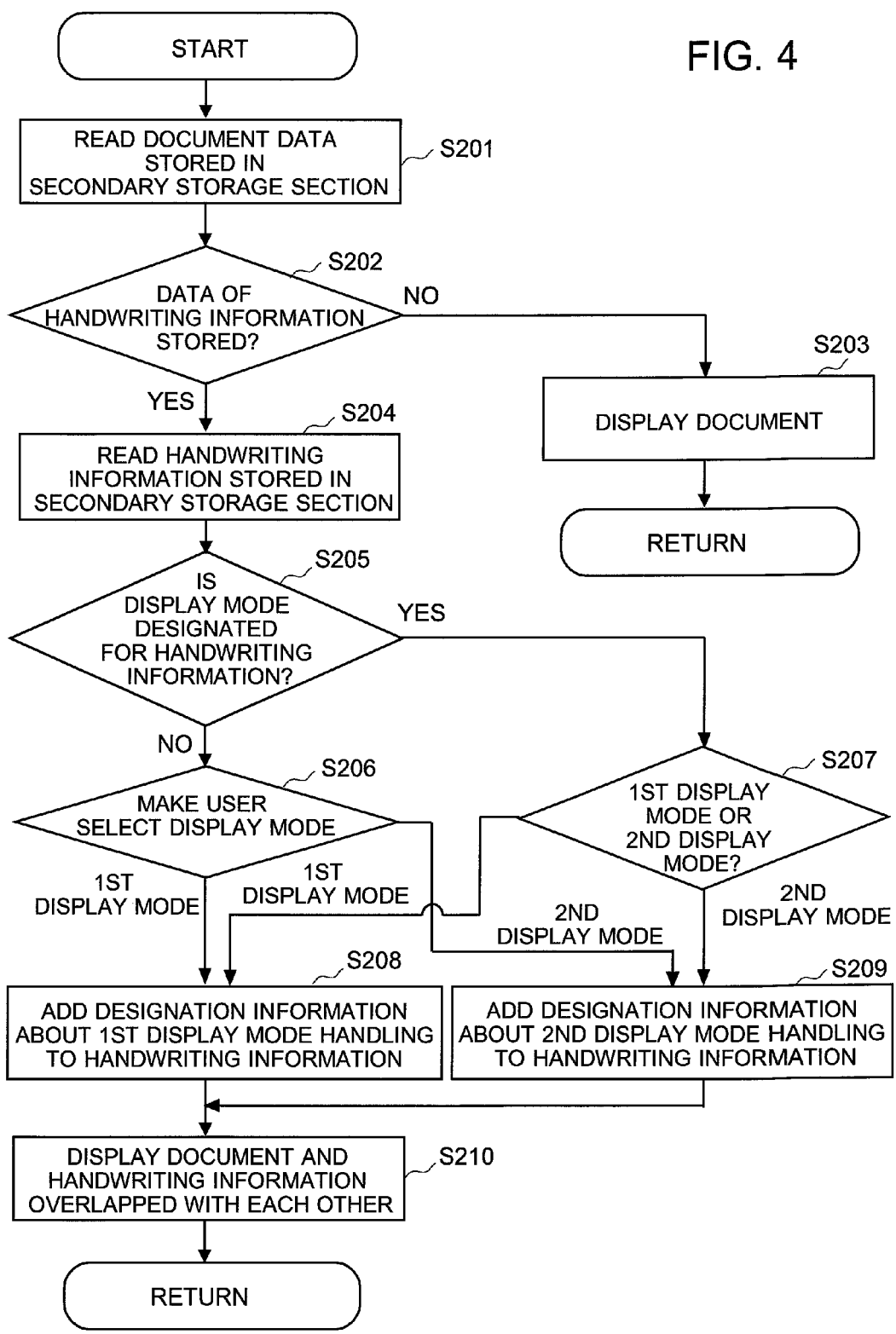
FIG. 4 illustrates a flowchart of a process (pre-processing) on an image display apparatus according to an embodiment of the present invention.

First, the control section 11 of the image display apparatus 10 executes pre-processing (step S101). FIG. 4 illustrates the pre-processing in detail, and the pre-processing is executed to incorporate separately stored handwriting information (handwriting information to which designation information is not added, for example, handwriting information or the like which has been inputted through a device other than the image display apparatus 10 of the present example) as information to be displayed in the second display mode of the present example.

Specifically, the control section 11 reads out the document data previously stored in the secondary storage section 11*d* (step S201). Then, the control section 11 determines whether data of handwriting information are stored in the secondary storage section 11*d* (step S202), and if the data of handwriting information are not stored, the control section 11 controls the image processing section 12 to make an image of the document based on the read-out document data on the first layer to generate screen information. The control section 11 then transmits the screen information to the display section 13 to display the screen information (step S203), and finishes the pre-processing.

On the other hand, if the data of handwriting information are stored, the control section 11 reads out the data of handwriting information stored in the secondary storage section 11*d* (step S204), determines whether the display mode has been designated to the read-out handwriting information (in other words, whether designation information is added to the data of handwriting information) (step S205). If the display mode has not been designated (no designation information is added), the control section 11 allows a user to select the display mode (step S206). On the other hand, if the display mode has been designated (designation information is added), the control section 11 determines, based on the designation information, which of the first display mode and the second display mode the designated display mode is (step S207).

Then, if the designated display mode or the display mode selected by the user is the first display mode, the control section 11 adds designation information to instruct about handling of the handwriting information in the first display mode to a header or the like of the read-out data of handwriting information (step S208). On the other hand, if the designated display mode or the display mode selected by the user is the second display mode, the control section 11 adds designation information to instruct about handling of the handwriting information in the second display mode to the header or the like of the read-out data of handwriting information (step S209). Note that the designation information has only to be information by which the control section 11 can determine that the handwriting information is the handwriting information which is to be displayed in the first display mode or in the second display mode (in other words, the handwriting information to be drawn on the second layer or the third layer). Then, the control section 11 controls the image processing section 12 to draw the document data (make an image of the document data) onto the first layer based on the document, to draw the handwriting information (make an image of the handwriting information) onto the second layer or the third layer, and to generate screen information in which the first layer, the second layer, and the third layer are overlapped together. The control section 11 then transmits the screen information to the display section 13 to display the screen information (step S210), and finishes the pre-processing.

Figure 3A:
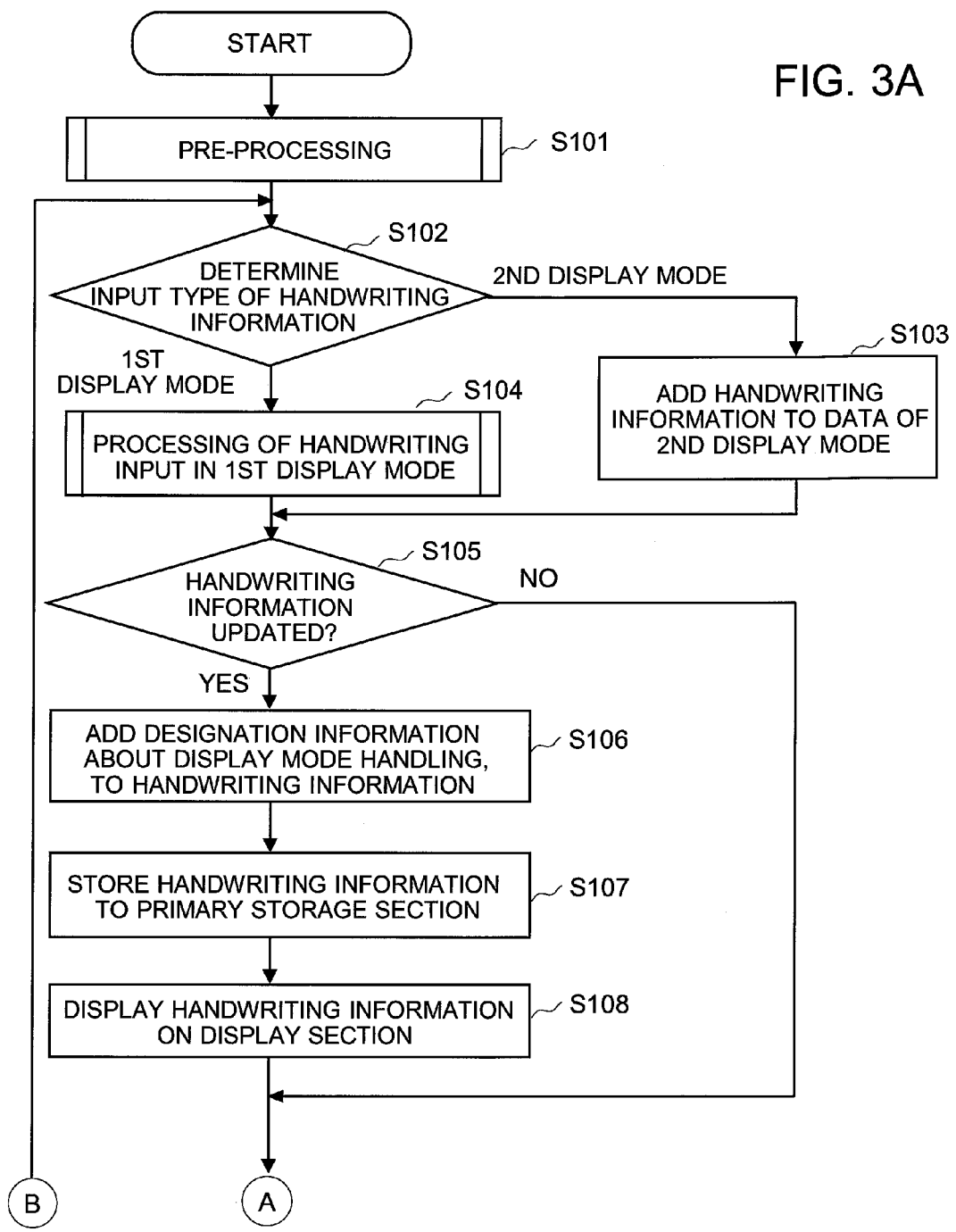
FIG. 3A and FIG. 3B illustrate a flowchart of an entire process on an image display apparatus according to an embodiment of the present invention.
Figure 3B:
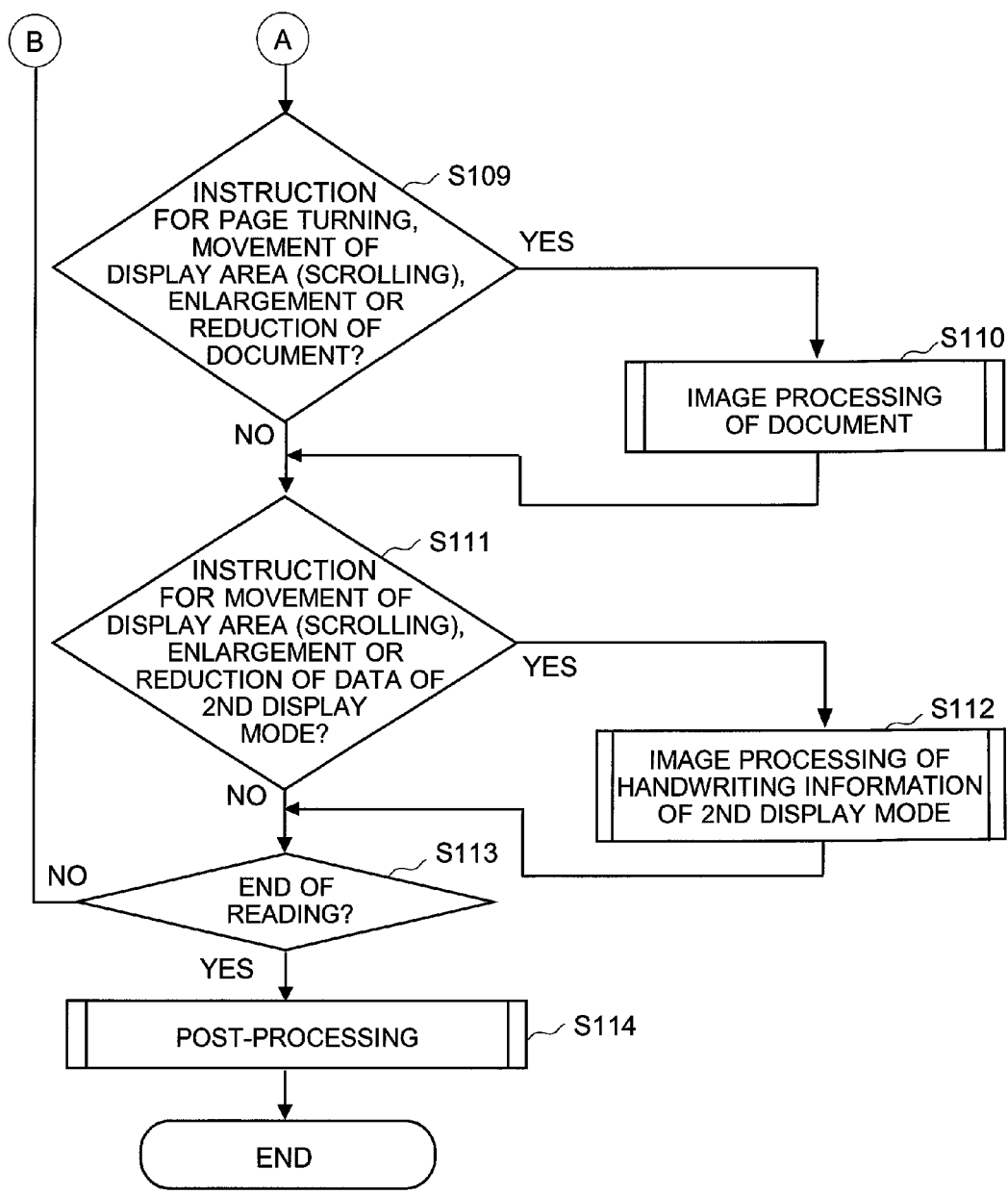

Going back to the flowchart of FIG. 3A and FIG. 3B, the control section 11 determines the type of input of handwriting information which is currently set (in other words, whether the handwriting information is accepted as information to be displayed in the first display mode or information to be displayed in the second display mode) (step S102). Note that the type of input of handwriting information is set by user's operation on the operation section 15. Then, if the handwriting information is accepted as the information to be displayed in the second display mode, the control section 11 additionally writes the inputted handwriting information into the data displayed in the second display mode (in other words, data whose image was made onto the third layer) (step S103).

Figure 5:
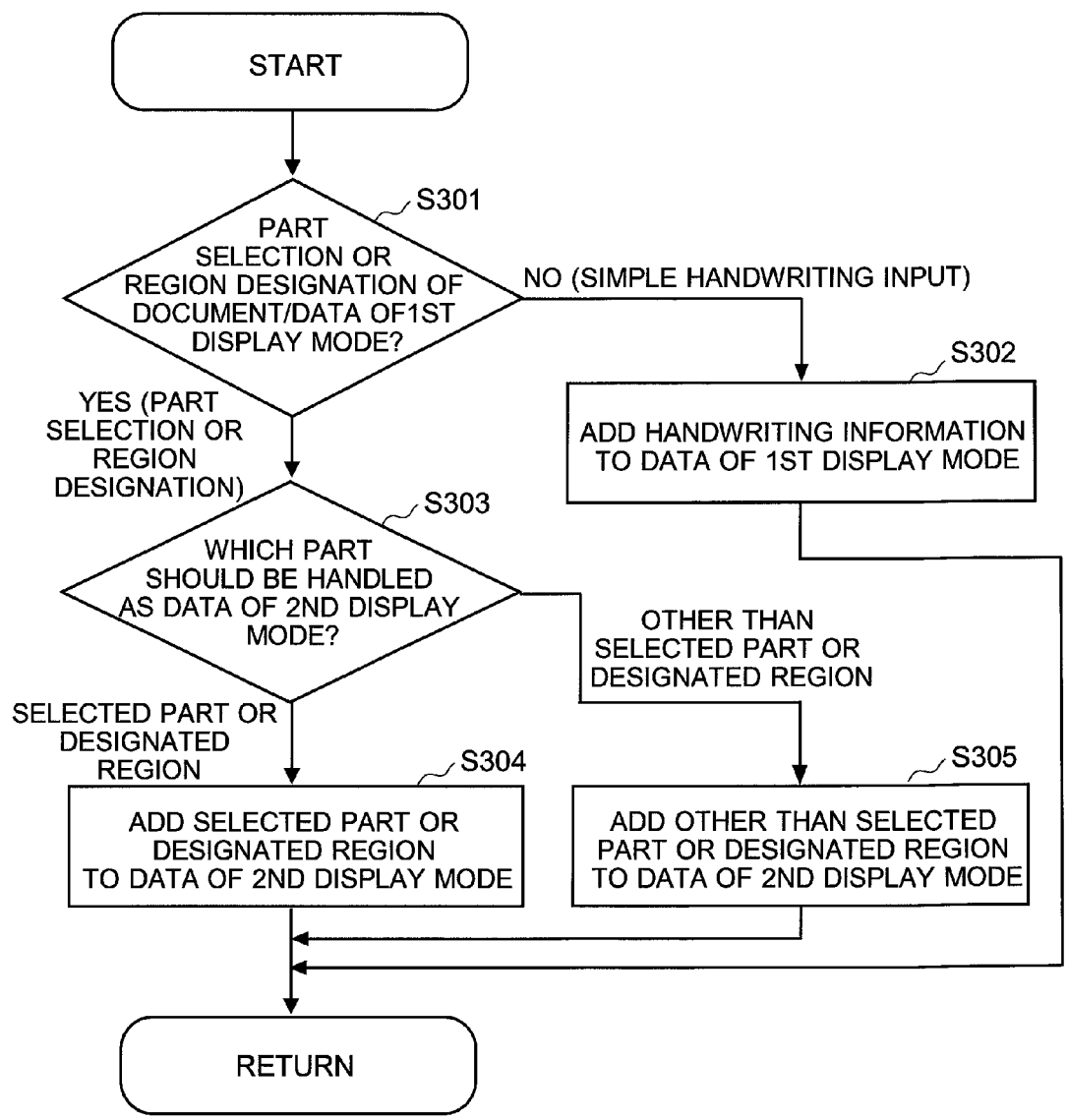
FIG. 5 illustrates a flowchart of a process (a handwriting input process in the first display mode) on an image display apparatus according to an embodiment of the present invention.

On the other hand, if the handwriting information is accepted as the information to be displayed in the first display mode, the control section 11 executes handwriting input processing in the first display mode (step S104). FIG. 5 illustrates in detail the handwriting input processing in the first display mode, and the processing is executed so as to handle a part of the document and/or a part of the handwriting information to be handled as information to be displayed in the first display mode, as information to be displayed in the second display mode.

Specifically, the control section 11 determines, based on signals outputted from the handwriting input section 14, whether an operation (for example, an operation of handwriting a box or frame) to select a part of the document or designate a region of the document and/or to select a part of the handwriting information displayed in the first display mode or designate a region of the handwriting information displayed in the first display mode, has been operated (step S301). If the operation is not for the part selection or the region designation, (in other words, a simple handwriting input), the control section 11 additionally writes the inputted handwriting information into the data in the first display mode (in other words, the data whose image was made on the second layer) (step S103), and then finishes the handwriting input processing in the first display mode.

On the other hand, if the operation is for the part selection or the region definition, the control section 11 determines whether the selected part or the designated region is designated to be handled as information to be displayed in the second display mode or whether the part other than the selected part or the designated region is designated to be handled as information to be displayed in the second display mode (step S303). Then, if the selected part or the designated region is designated to be handled as data of the second display mode, the control section 11 additionally write the document and/or the handwriting information in such part into the data of the second display mode (in other words, the data whose image was made on the third layer) (step S304). If the part other than the selected part or the designated region is designated to be handled as data of the second display mode, the document and/or the handwriting information in the part other than such part other than the concerned part, is additionally written into the data of the second display mode (step S305). Then, the handwriting input processing in the first display mode is then finished.

Going back to the flowchart of FIG. 3A and FIG. 3B again, the control section 11 checks, based on signals outputted from the handwriting input section 14, whether the handwriting information has been updated (step S105). If the handwriting information has not been updated, the process goes to step S109. On the other hand, if the handwriting information has been updated, the control section 11 adds the designation information according to the mode of input determined in step S102 to the data of the updated handwriting information (step S106), and stores the data of handwriting information in the primary storage section 11c (step S108). Then the control section 11 controls the image processing section 12 to make an image of the handwriting information onto the second layer or the third layer, according to the designation information and to generate screen information in which the first layer, the second layer, and the third layer are overlapped together, then the control section 11 transmits the screen information to the display section 13 to display the screen information (step S108).

Figure 6A:
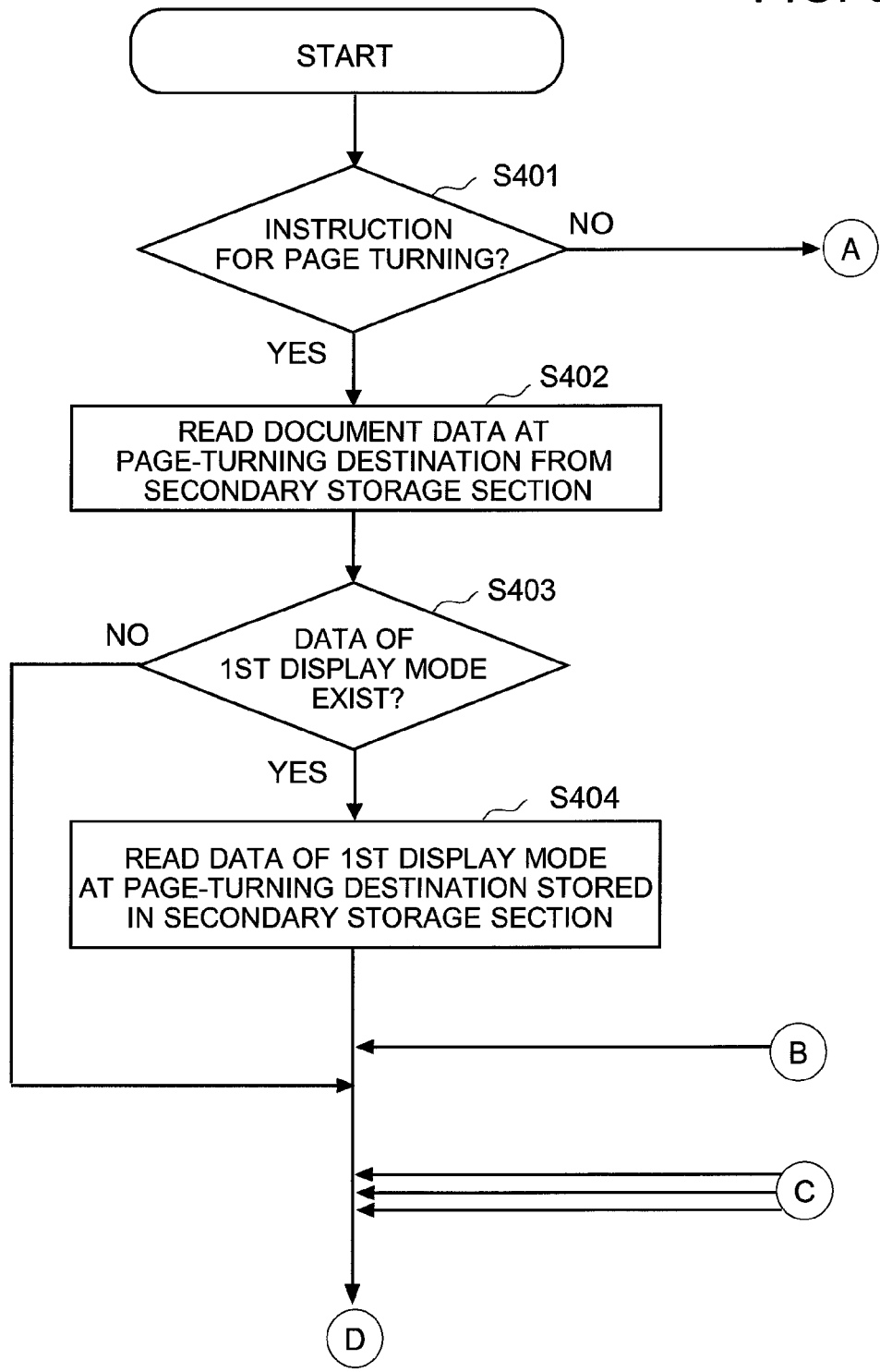
Figure 6B:
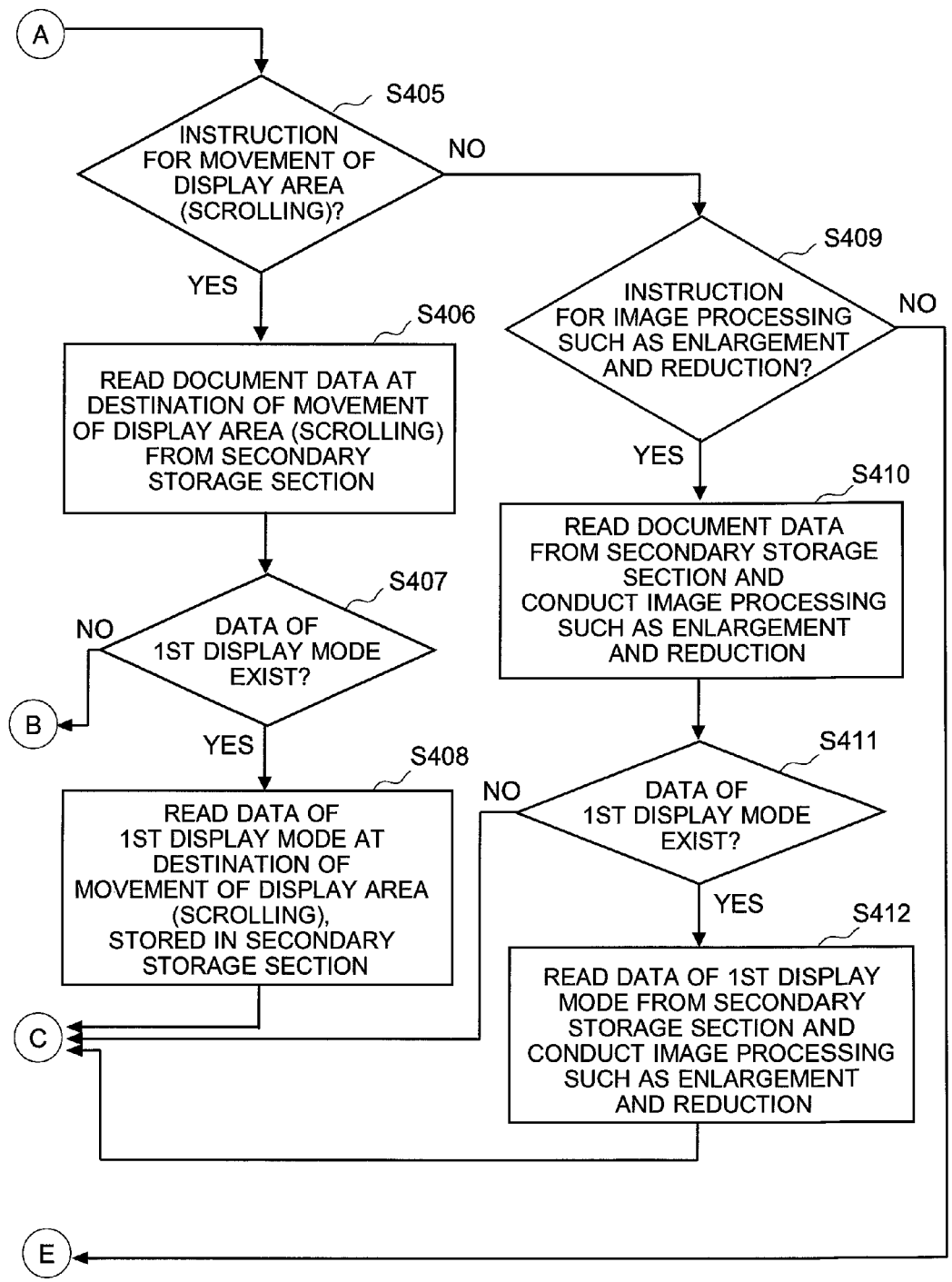

Then the control section 11 determines whether page turning of the document, movement of the display area (scrolling), enlargement or reduction has been instructed by the operation onto the document (for example, the operation on the hardware switch previously provided on the operation section 15 for the document) was performed (step S109). When determining that any of the above instructions has been operated, the control section 11 conducts drawing processing of the document (processing of making an image of the document) (step S110). FIG. 6A, FIG. 6B and FIG. 6C illustrate the drawing processing of the document in detail, and the drawing processing is conducted so as keep the absolute position of the handwriting information displayed on the second display mode relative to the display area even when the display state of the document has been changed.

Specifically, the control section 11 determines whether page turning has been instructed (step S401). If the page turning has been instructed, the control section 11 reads out the document data which is the page-turning destination, from the secondary storage section 11d (step S402). Then the control section 11 determines whether there are data of the first display mode at the destination of the page turning (the handwriting information associated with the document at the destination of the page turning) (step S403), and if the data exist, the control section 11 reads out the data of the first display mode at the destination of the page turning stored in the secondary storage section 11d (step S404).

Alternatively, if the page turning has not been instructed in step S401, the control section 11 determines whether movement of the display area (scrolling) has been instructed (step S405), and if the movement of the display area has been instructed, the control section 11 reads out the document data at the moving destination of the display area from the secondary storage section 11d (step S406). Then, the control section 11 determines whether there are data in the first display mode at the moving destination (the handwriting information associated with document at the moving destination) (step S407), and if the data exist, the control section 11 reads out the data of the first display mode at the moving destination stored in the secondary storage section 11d (step S408).

Alternatively, the movement of the display area has not been instructed in step S405, the control section 11 determines whether the image processing such as enlargement and reduction has been instructed (step S409). If the image processing such as enlargement and reduction has not been instructed, the process goes to step S415. Alternatively, if the image processing such as enlargement and reduction has been instructed, the control section 11 reads out the document data from the secondary storage section 11d and conducts the image processing such as enlargement and reduction (step S410). Then, the control section 11 determines whether there are data of the first display mode (the handwriting information associated with the document which is a source of the image processing) (step S411), and if the data exist, the control section 11 reads out the data of the first display mode stored in the secondary storage section 11d and conducts the image processing such as enlargement and reduction, similarly to the document data (step S412).

Then, the control section 11 determines whether there are data of the second display mode (the handwriting information not associated with the document) (step S413). If the data exist, the control section 11 reads out the data of the second display mode stored in the primary storage section 11c (step S414). Note that the control section 11 just reads out the data of the second display mode here, and does not conduct image processing or the like onto the data of the second display mode. Then, the control section 11 operates the image processing section 12 to draw the document data (make an image of the document data) onto the first layer based on the document, to draw the existing handwriting information of the first and/or second display mode (make an image of the existing handwriting information of the first and/or second display mode) onto the second layer or the third layer, to generate screen information in which the first layer, the second layer, and the third layer are overlapped (combined) together, to transmit the screen information to the display section 13 to display the screen information (step S415). Then the drawing processing of the document is finished.

Figure 7:
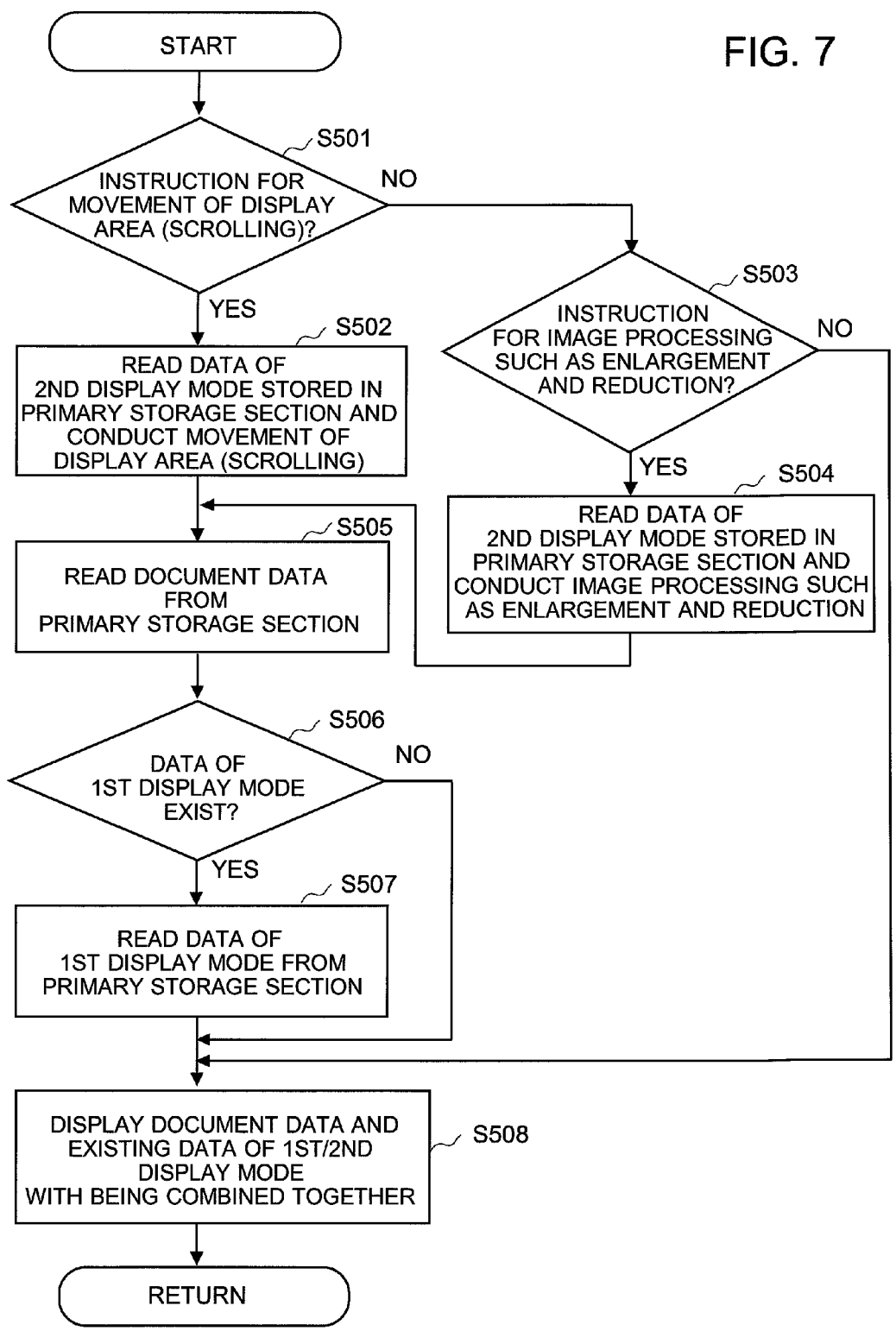
FIG. 7 illustrates a flowchart of a process (image processing of handwriting information in the second display mode) on an image display apparatus according to an embodiment of the present invention.

Going back to the flowchart of FIG. 3A and FIG. 3B again, the control section 11 determines whether the movement of the display area (scrolling) of the data of the second display mode, enlargement or reduction has been instructed by a predetermined operation different from one on the document (for example, an operation on a hardware switch, for handwriting information, previously provided on the operation section 15) (step S111). In the case of determining that any one of the above instructions has been done, the control section 11 conducts the drawing processing on the handwriting information of the second display mode (processing of making an image of the handwriting information of the second display mode) (step S112). FIG. 7 illustrates in detail the drawing processing of the handwriting information of the second display mode, and this process is conducted so as to keep the absolute position of the document and/or the handwriting information displayed in the first display mode, relative to the display area even when the display state of the handwriting information displayed in the second display mode is changed.

Specifically, the control section 11 determines whether the movement of the display area (scroll) has been instructed (step S501). If the movement of the display area has been instructed, the control section 11 reads out the data of the second display mode stored in the primary storage section 11c and moves the display area (step S502). Alternatively, in the case that the movement of the display area has not been instructed in step S501, the control section 11 determines whether the image processing such as enlargement and reduction has been instructed (step S503). If image processing such as enlargement and reduction has not been instructed, the process goes to step S508, and if image processing such as enlargement and reduction has been instructed, the control section 11 reads out the data of the second display mode stored in the primary storage section 11c and conducts the image processing such as enlargement and reduction (step S504). Then the control section 11 reads out the document data from the secondary storage section 11d (step S505). Note that the control section 11 only reads out the document data here, and the control section 11 does not conducts image processing onto the document data.

Then, the control section 11 determines whether there are data of the first display mode (step S506), if the data exist, the control section 11 reads out the data of the first display mode (the handwriting information associated with the document) from the primary storage section 11c (step S507).

Note that the control section 11 only reads out the data in the first display mode here, the control section 11 does not conduct image processing onto the data. Then, the control section 11 operates the image processing section 12 to draw the document data (make an image of the document data) on the first layer based on the document, to draw the existing handwriting information (make an image of the existing handwriting information) of the first and/or second display mode onto the second layer or the third layer, to generate screen information in which the first layer, the second layer, and the third layer are overlapped (combined) together, and to transmit the screen information to the display section 13 to display the screen information (step S508). Then the drawing processing of the handwriting information of the second display mode is finished.

Figure 8:
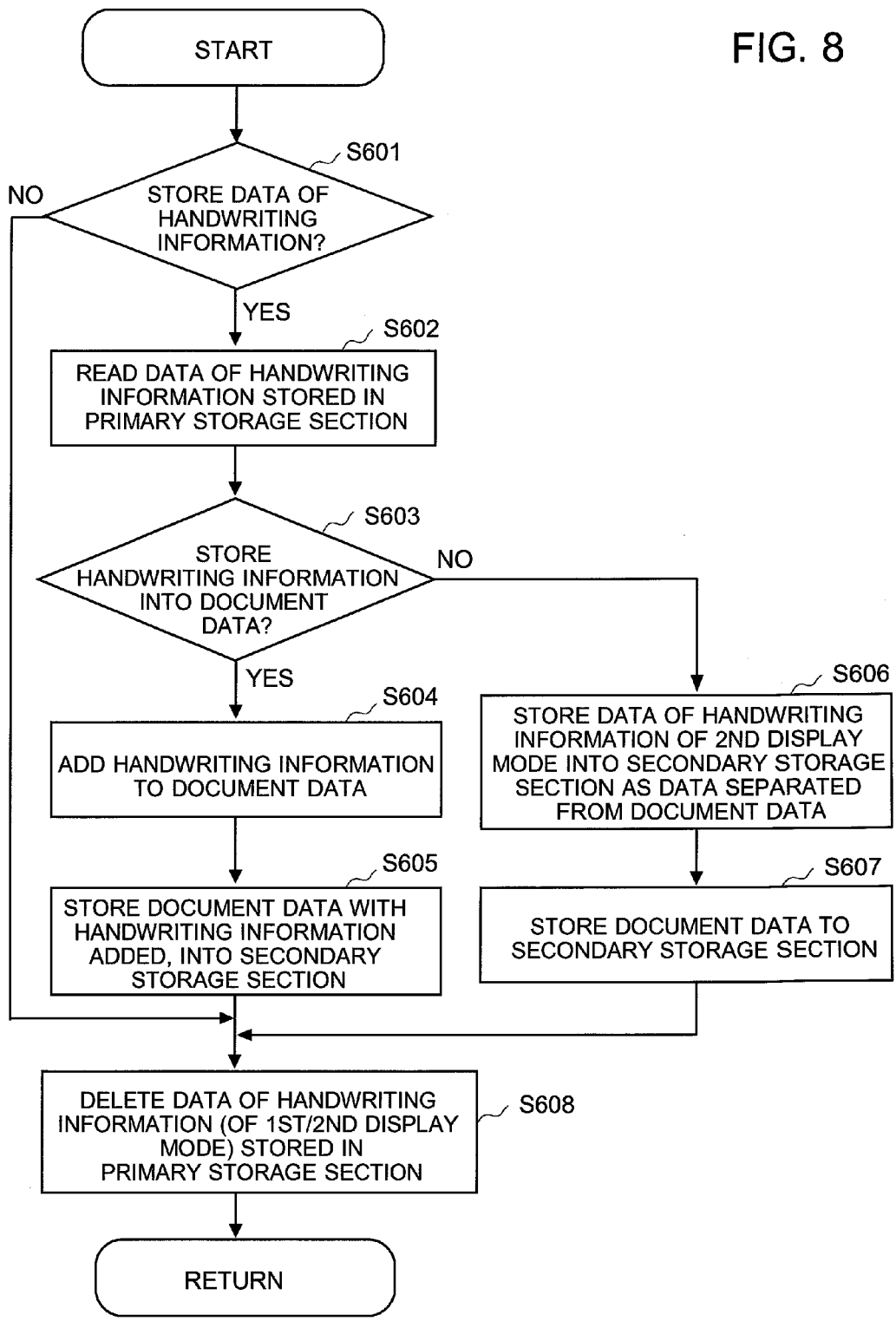
FIG. 8 illustrates a flowchart of a process (post-processing) on an image display apparatus according to an embodiment of the present invention.

Going back to the flowchart of FIG. 3A and FIG. 3B again, the control section 11 determines whether an operation for finishing the reading has been operated by the user, based on signals outputted from the operation section 15 (step S113). If the reading is not finished, the process goes back to step S102 and the same processes are repeated. On the other hand, the reading is to be finished, the control section 11 conducts post-processing (step S114). FIG. 8 illustrates the post-processing in detail, the post-processing is conducted so as to allow a user to choose the way to store the data of handwriting information from storing the data of handwriting information together with the document data and storing only the data of handwriting information of the second display mode to be separated from the document data.

Specifically, the control section 11 determines whether the operation for storing the data of handwriting information has been performed, based on signals outputted from the operation section 15 (step S601). In the case that the data of handwriting information is not to be stored, the process goes to step S608, and in the case that the data of handwriting information are to be stored, the control section 11 reads out the data of handwriting information stored in the primary storage section 11c (step S602) and determines whether settings are made so that the handwriting information is to be stored in the document data (step S603).

In the case that settings are made so that the handwriting information is to be stored in the document data, the control section 11 adds the handwriting information of the second display mode (or the handwriting information of the first display mode and the second display mode) to the document data (step S604), and stores the document data with the handwriting information attached thereto in the secondary storage section 11d (step S605). On the other hand, settings are made so that the handwriting information are not to be stored in the document data, the control section 11 stores the data of handwriting information of the second display mode (or the data of handwriting information of the first display mode and the second display mode) in the secondary storage section 11d as the data separated from the document data (step S606), and records the document data in the secondary storage section 11d (step S607).

After that, the control section 11 deletes the data of the handwriting information of the first display mode and the data of handwriting information in the second display mode stored in the primary storage section 11c (step S608), and then finishes the post-processing.

The above-described display control of the handwriting information will be specifically described below with reference to FIG. 9A through FIG. 12C.

Figure 9A:
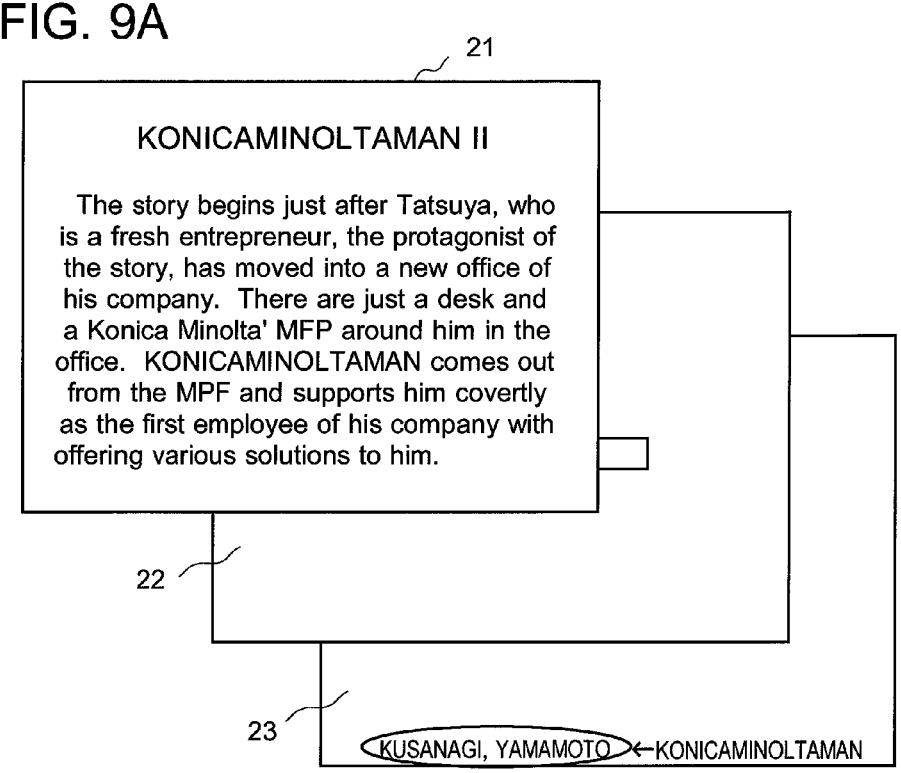
FIGS. 9A to 9D are diagrams illustrating a display example of handwriting information on an image display apparatus according to an embodiment of the present invention.
Figure 9B:
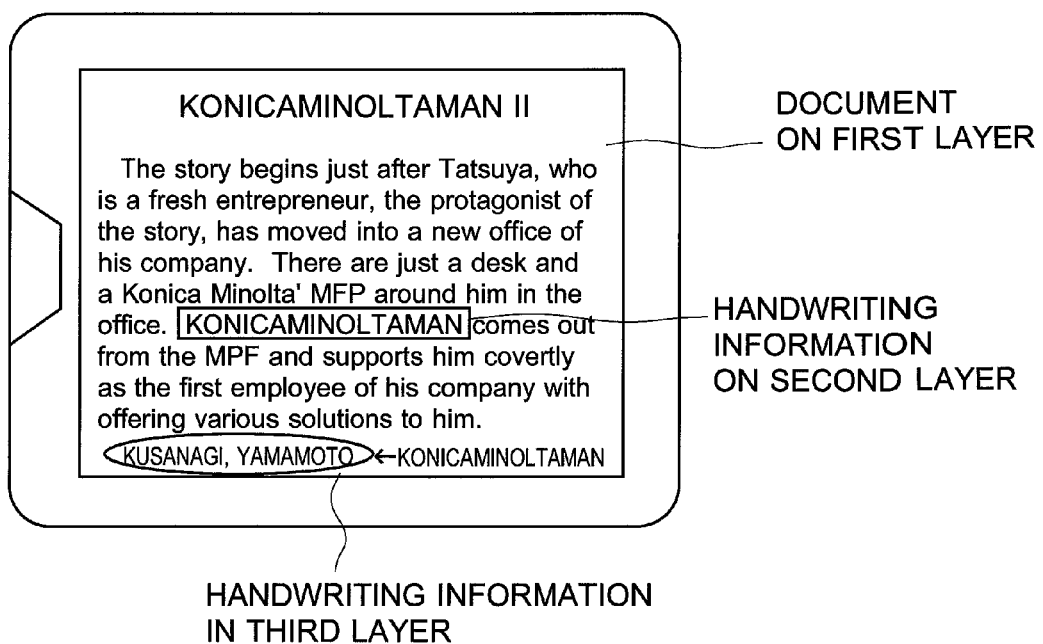
Figure 9C:
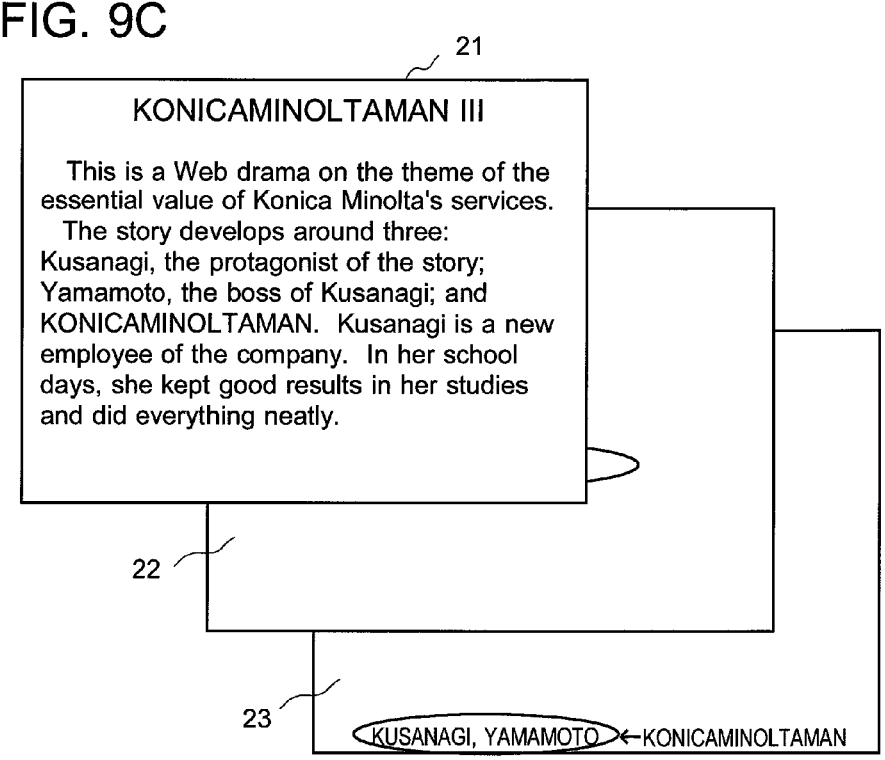
Figure 9D:
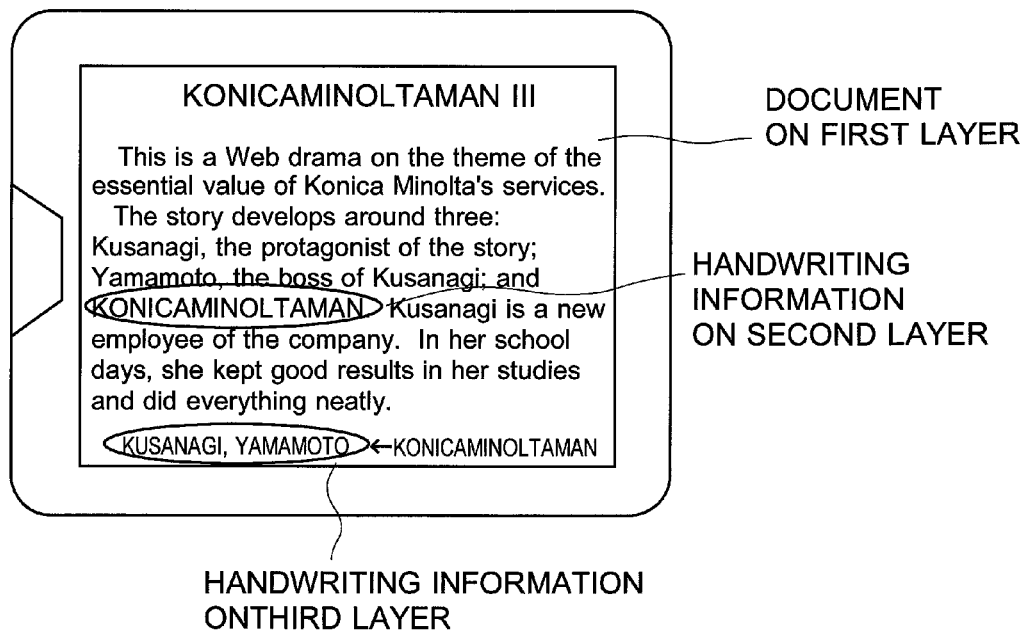

FIG. 9A illustrates a first layer 21 to a third layer 23 of a certain page (page "n"), and FIG. 9B illustrates an example of the page displayed on the image display apparatus of the present example. FIG. 9C illustrates a first layer 21 to a third layer 23 of the next page (page "n+1"), and FIG. 9D illustrates an example of the next page displayed on the image display apparatus of the present example. As illustrated in FIGS. 9A to 9D, in the image display apparatus 10 of the present example, a page is displayed with the following layers being overlapped together: a layer (the first layer 21 shown in FIGS. 9A and 9C) on which a document is drawn; a layer (the second layer 22 shown in FIGS. 9A and 9C) on which handwriting information is drawn in association with a document; and a layer (the third layer 23 shown in FIGS. 9A and 9C) on which handwriting information is drawn not in association with a document (fixed relative to the display area). Thus, when the page is changed from one page (page "n" in FIG. 9B drawing) to the next page (page "n+1" in FIG. 9D), the handwriting information (the handwriting information of the first display mode) drawn on the second layer 22 is updated, but the handwriting information (the handwriting information in the second display mode) drawn on the third layer 23 is not updated and remains unchanged.

Figure 10A:
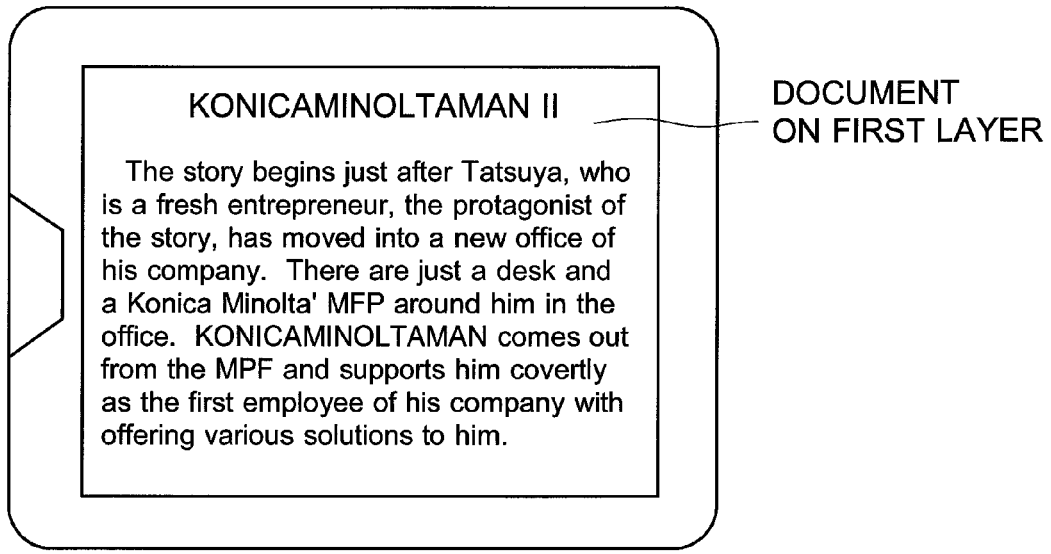
FIGS. 10A to 10E are diagrams illustrating another display example of handwriting information on an image display apparatus according to an embodiment of the present invention.
Figure 10B:
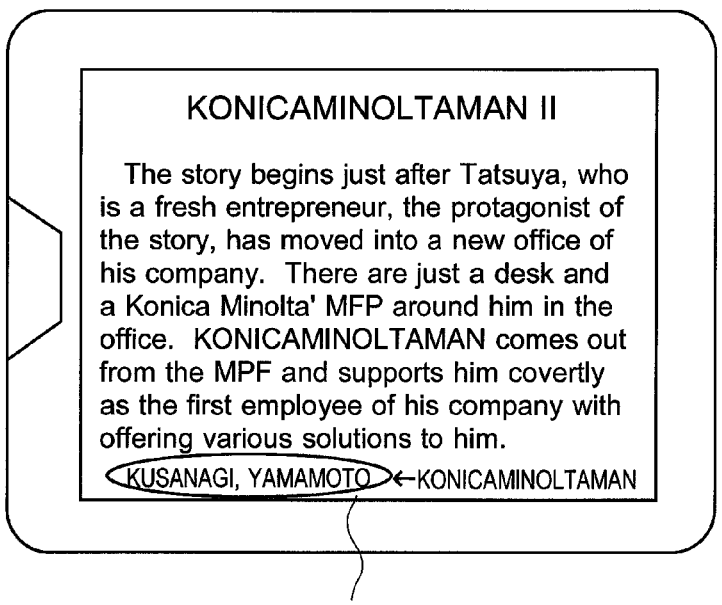
Figure 10C:
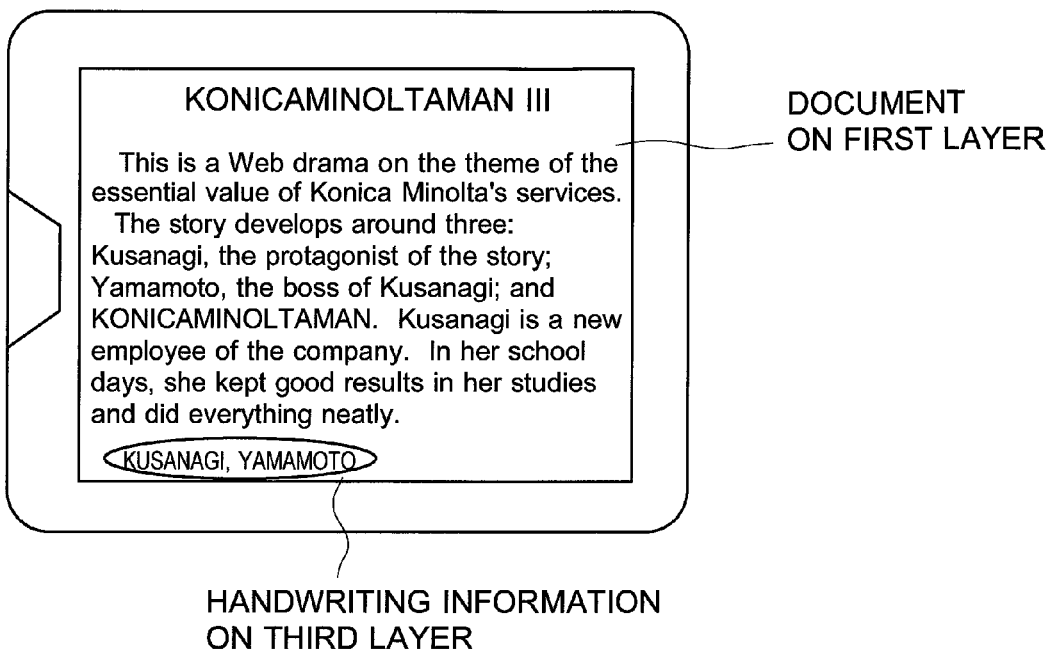
Figure 10D:
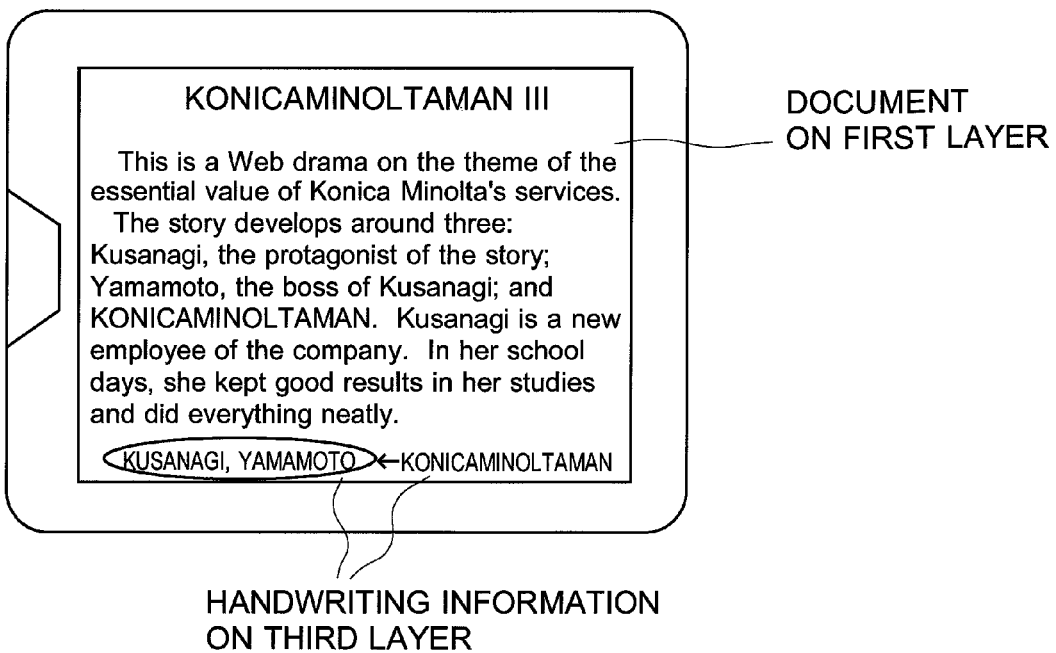
Figure 10E:
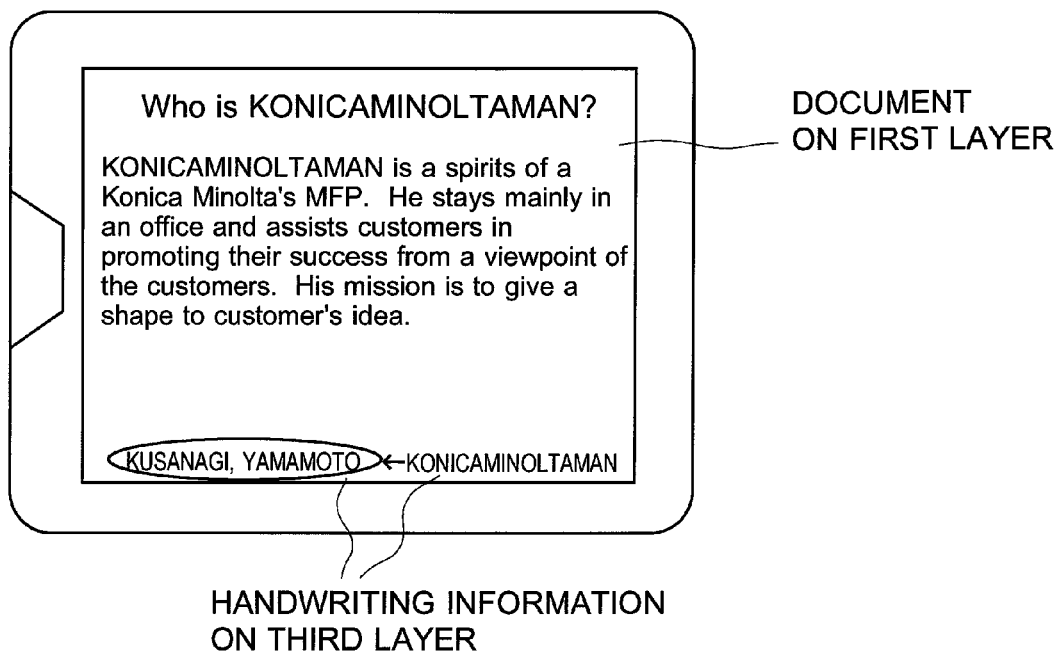

As a specific example, there is given a situation that, when the image display apparatus displays page "n" as illustrated in FIG. 10A, where a document is drawn on the first layer 21, a user has inputted handwriting information as illustrated in FIG. 10B. If settings has been made so that handwriting information is to be handled as information to be displayed in the second display mode (the right branch of step S102 in FIG. 3A), the handwriting information is additionally written in the data of the second display mode (step S103 in FIG. 3A); thus, even when the page is changed to page "n+1" (step S401 in FIG. 6A: YES), the handwriting information is not updated as illustrated in FIG. 10C and remains unchanged (step S414 in FIG. 6C). Similarly, in the case that the handwriting information is updated at page "n+1" (step S105 in FIG. 3A: YES) as illustrated in FIG. 10D, because the handwriting information is attached with designation information to be handled as the information to be displayed in the second display mode (step S106 in FIG. 3A), even when the page is changed to page "n+2", the handwriting information inputted on page "n" and the handwriting information inputted on page "n+1" are displayed unchanged as illustrated in FIG. 10E. That is to say, the handwriting information inputted at the moving source page can be shown at the moving destination page.

Figure 11A:
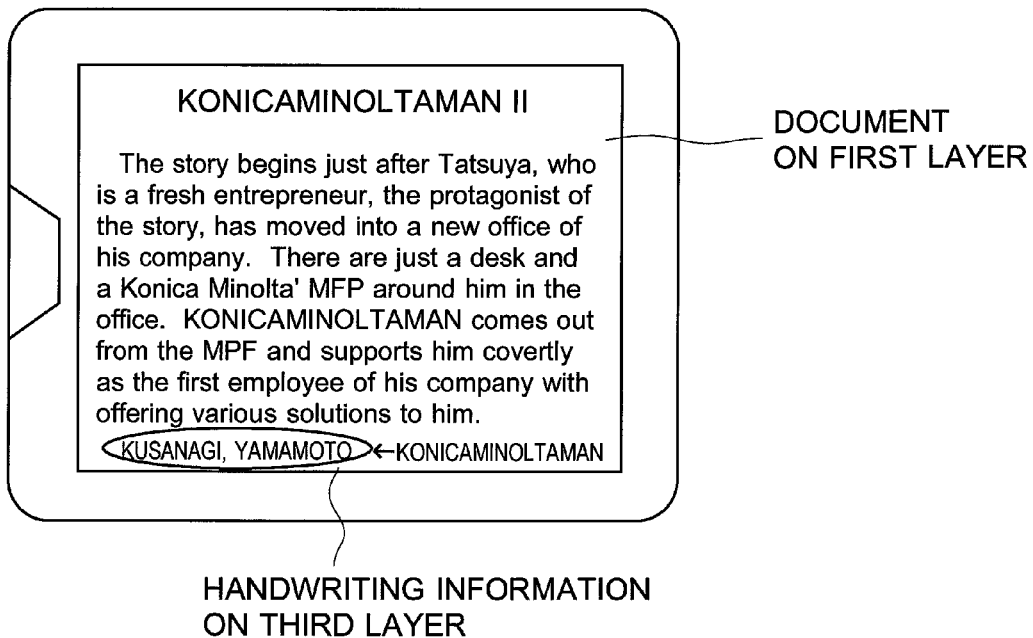
FIGS. 11A to 11D are diagrams illustrating another display example of handwriting information on an image display apparatus according to an embodiment of the present invention.
Figure 11B:
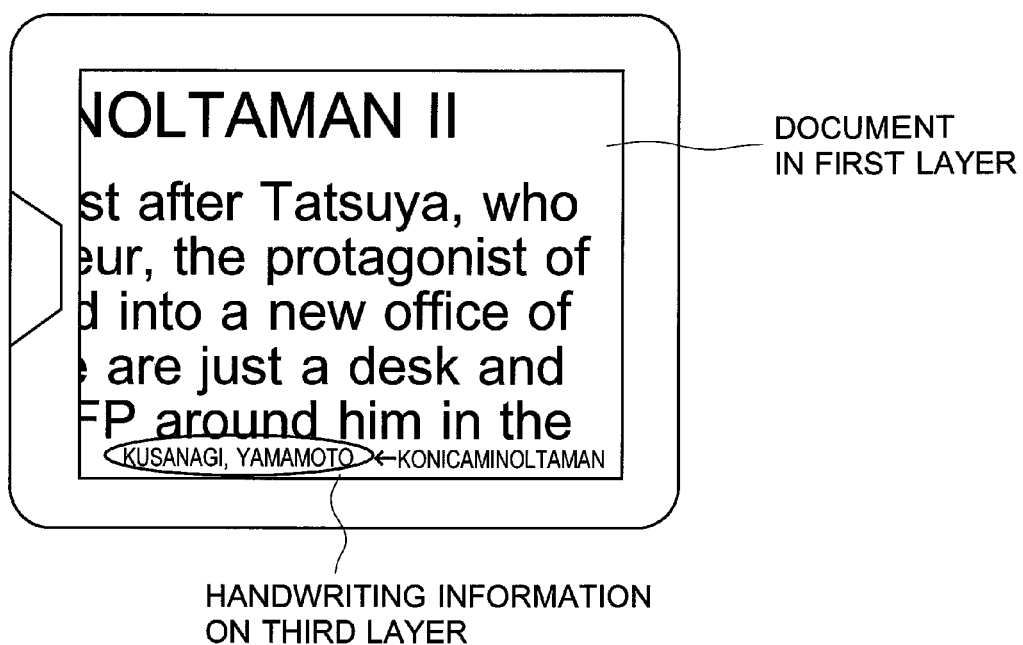
Figure 11C:
Figure 11D:
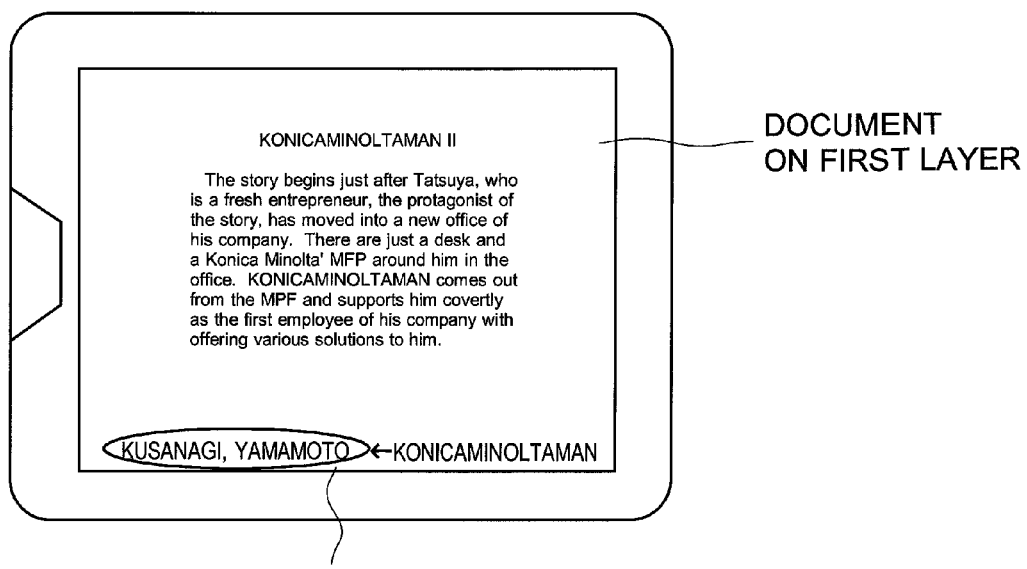

As another example, there is given a situation that when the image display apparatus 10 of the present example displays a certain page of the document over the entire of the display area as illustrated in FIG. 11A, a user conducts enlargement or reduction of the document as illustrated in FIG. 11B (step S409 in FIG. 6B: YES). The handwriting information (the handwriting information on the third layer 23) which is stored as the information to be displayed in the second display mode is not associated with the document; thus, the handwriting information is not enlarged (step S414 in FIG. 6C) and displayed at the original magnification as illustrated in FIG. 11B, whereby the handwriting information does not disturb the reading of the document. Further, even in the case that another part of the page has been made to be displayed (the screen has been scrolled) when the document has been displayed being enlarged (step S405 in FIG. 6B: YES), the handwriting information is displayed as is without disappearing from the display area as illustrated in FIG. 11C; thus, the document can be read on while the handwriting information is being confirmed. Alternatively, when the page has been reduced, the handwriting information is displayed at the original magnification without being reduced as shown in FIG. 11D; thus the handwriting information does not become difficult to read.

Figure 12A:
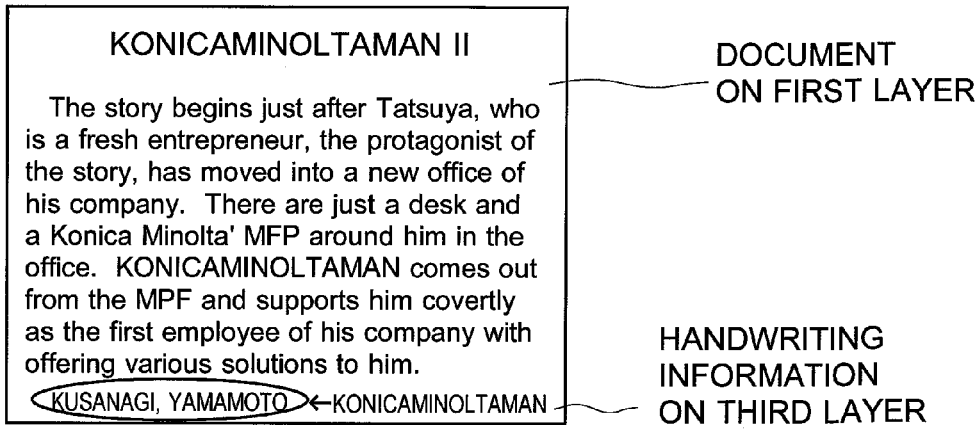
FIGS. 12A to 12C are diagrams illustrating another display example of handwriting information on an image display apparatus according to an embodiment of the present invention.
Figure 12B:
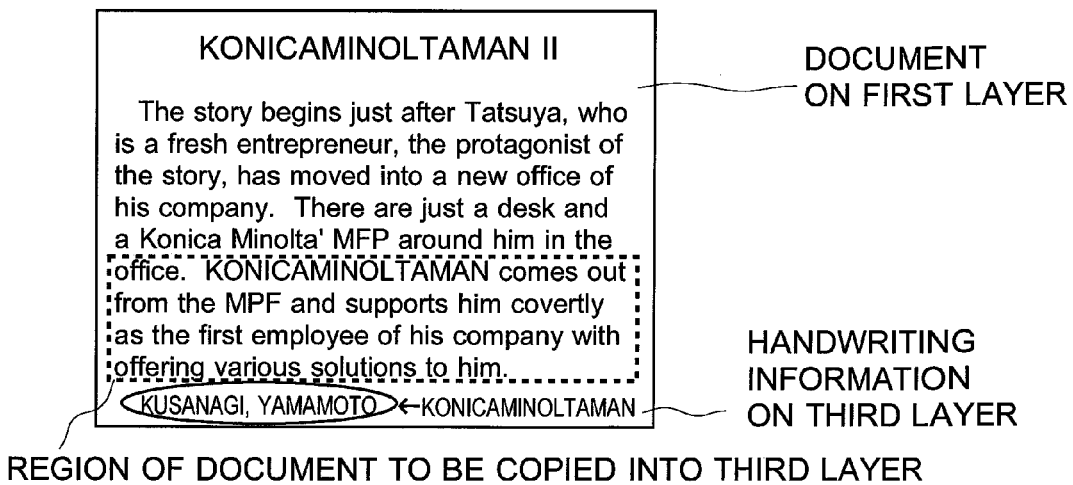
Figure 12C:
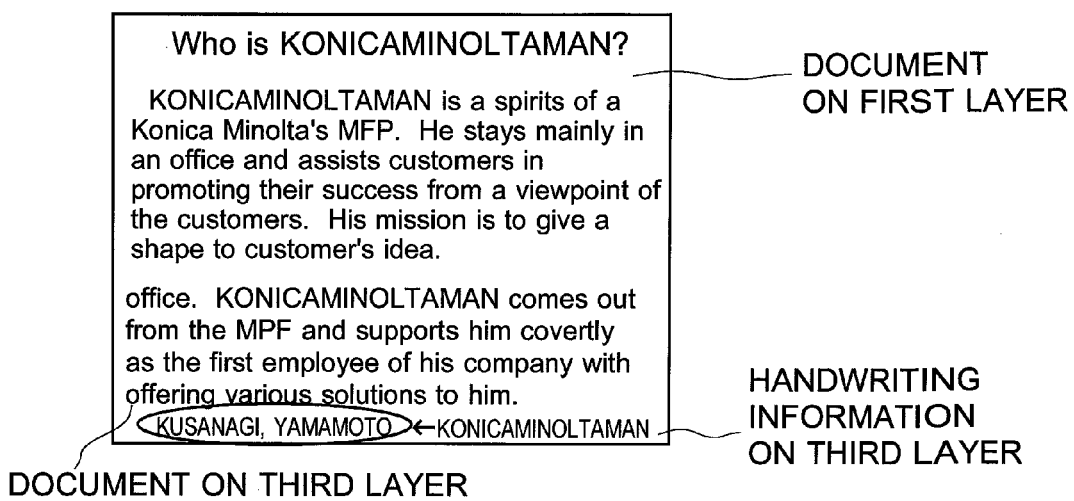

As another example, there is given a situation that when the image display apparatus 10 of the present example has displayed a document with handwriting being inputted thereon as illustrated in FIG. 12A, a user has designated a part of the document and/or a part of the whole of the handwriting information of the first display mode (step S301 in FIG. 5: YES) as illustrated in FIG. 12B. The document in the designated region and/or the handwriting information of the first display mode is additionally written in the data in the second display mode (step S304 in FIG. 5), or the document and/or the hardwiring information of the first display mode outside the designated region is additionally written in the data of the second display mode (step S305 in FIG. 5); thus, those data and information can be handled in a similar way to the handwriting information of the second display mode, whereby those data and information can be displayed on another page as illustrated in FIG. 12C.

Figure 13A:
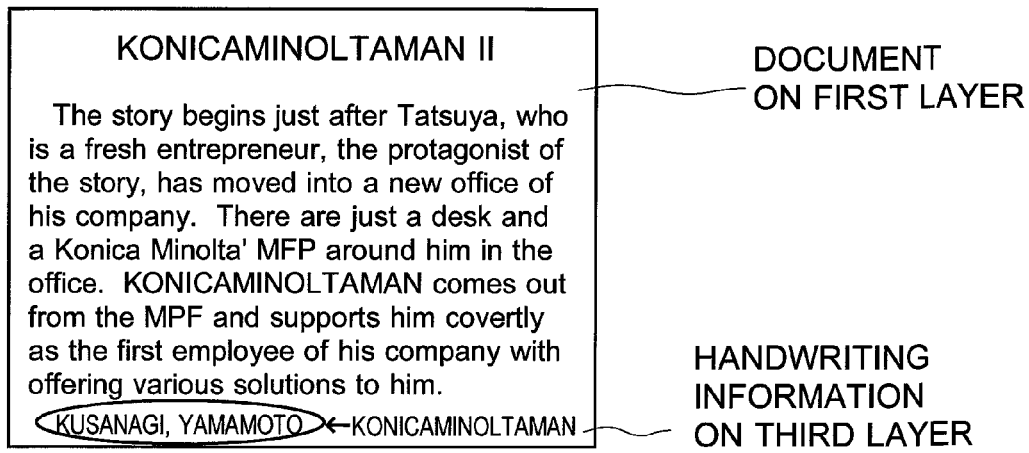
FIGS. 13A to 13C are diagrams illustrating another display example of handwriting information on an image display apparatus according to an embodiment of the present invention.
Figure 13B:
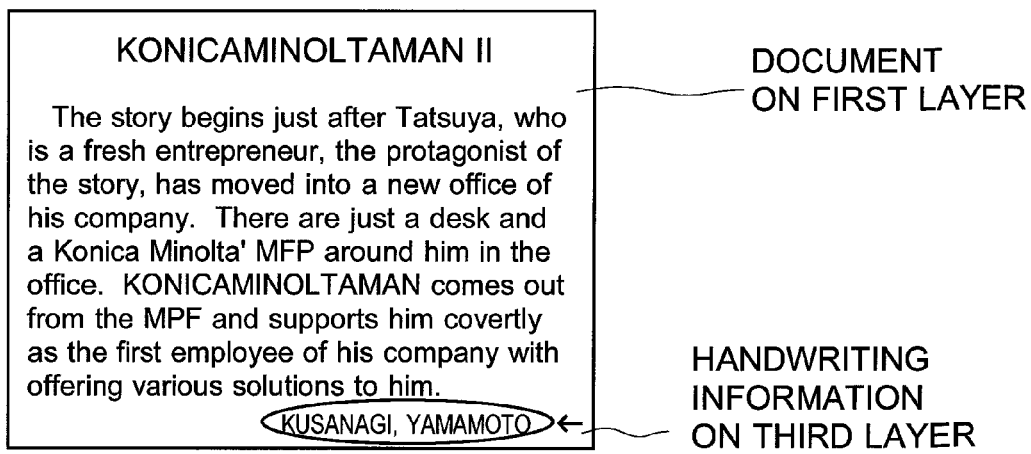
Figure 13C:
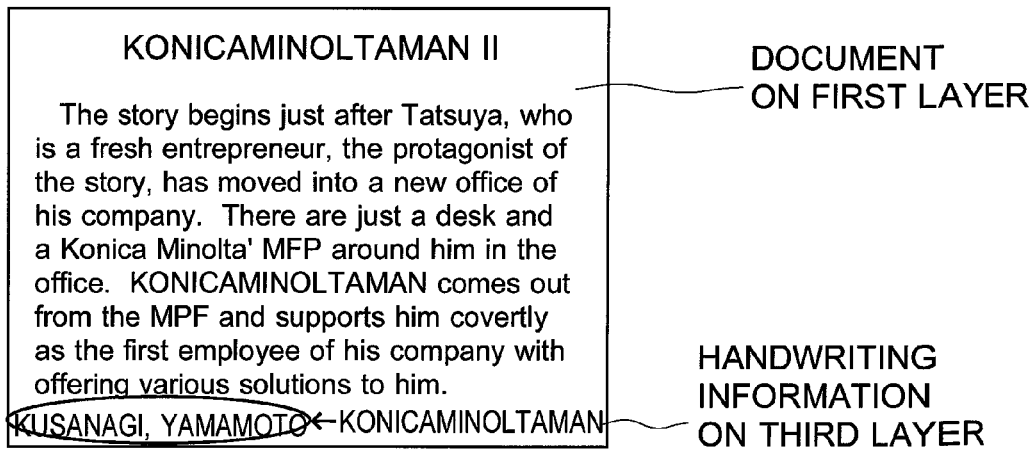

As another example, there is given a situation that when the image display apparatus 10 of the present example has displayed a document with handwriting being inputted thereon as illustrated in FIG. 13A, a user has instructed movement of the display area of the handwriting information of the second display mode (the handwriting information drawn on the third layer) (step S501 in FIG. 7: YES). In this situation, the movement of the display area is conducted on the concerned handwriting information (step S502 in FIG. 7); however, these processes are not conducted on the document or the handwriting information of the first display mode (steps S505 and S507 in FIG. 7), whereby only the handwriting information in the second display mode can be moved without the display state of the document or the handwriting information of the first display mode being changed as illustrated in FIG. 13B. Further, when a user has instructed image processing such as enlargement and reduction of the handwriting information of the second display mode (step S503 in FIG. 7: YES), the image processing such as enlargement and reduction is conducted on the handwriting information (step S504 in FIG. 7). However, these processes are not conducted on the document or the handwriting information of the first display mode (steps S505 and S507 in FIG. 7), whereby only the handwriting information of the second display mode can be enlarged or reduced without the display state of the document or the handwriting information of the first display mode being changed as illustrated in FIG. 13C.

The present invention is not limited to the above-described embodiments and examples, and the configuration and the control thereof can be appropriately modified without departing from the spirit of the present invention.

For example, in the above example, description is made on the case that the handwriting information of the first display mode is drawn on the second layer, and the handwriting information of the second display mode is drawn on the third layer, and the first layer and the second layer and the third layer are overlapped together to be displayed. However, the present invention can apply to the case that the handwriting information is drawn only on the third layer, and the first layer and the third layer are overlapped together to be displayed (in other words, the handwriting information is never associated with the document).

The invention claimed is:
1. A non-transitory computer-readable storage medium storing a display control program for an apparatus compris- ing a touch panel, the display control program causing a processor of the apparatus to perform processes comprising:

displaying a document in a display area of the touch panel;

accepting an input of handwriting information via the touch panel;

accepting a designation of a display mode as one of a first display mode and a second display mode;

adding display mode designation information to the handwriting information, to designate the handwriting information as handwriting information designated to be displayed in the first display mode or as handwriting information designated to be displayed in the second display mode, in accordance with the designated display mode;

displaying the handwriting information in the display area; and in response to detecting an input operation to change the display of the document displayed in the display area, (i) changing the display of the document in accordance with the input operation, (ii) controlling the display of the handwriting information designated to be displayed in the first display mode such that the display of the handwriting information is changed in a same manner as the display of the document, and (iii) controlling the display of the handwriting information designated to be displayed in the second display mode such that a display state of the handwriting information is maintained even if the input operation is one of a page turning operation which turns a page of the document in the display area, a movement operation which moves the displayed content in the display area, an enlargement operation which enlarges the displayed content in the display area, and a reduction operation which reduces the displayed content in the display area.

2. The non-transitory computer-readable storage medium of claim 1, wherein the processes further comprise:

assigning an image of the document to a first layer;

assigning an image of the handwriting information designated to be displayed in the first display mode, to a second layer;

assigning an image of the handwriting information designated to be displayed in the second display mode, to a third layer; and displaying the first layer, the second layer, and the third layer such that the first, second, and third layers overlap in the display area, thereby displaying the document in the display area and displaying the handwriting information in the display area.

3. The non-transitory computer-readable storage medium of claim 2, wherein the processes further comprise, in response to receiving a designation of a region of the document on the first layer, assigning an image of the document within the region or an image of the document outside the region, to the third layer.

4. The non-transitory computer-readable storage medium of claim 2, wherein the processes further comprise, in response to receiving a designation of a region of the handwriting information on the second layer, assigning an image of the handwriting information within the region or an image of the handwriting information outside the region, to the third layer.

5. The non-transitory computer-readable storage medium of claim 2, wherein the controlling the display of the handwriting information designated to be displayed in the second display mode comprises, upon the document on the first layer moving relative to the display area, maintaining a location of the handwriting information on the third layer relative to the display area.

6. The non-transitory computer-readable storage medium of claim 2, wherein the processes further comprise, upon the handwriting information on the third layer moving relative to the display area, maintaining a location of the document on the first layer relative to the display area.

7. The non-transitory computer-readable storage medium of claim 2, wherein the processes further comprise storing the handwriting information on the third layer into a storage, as data separated from the document on the first layer.

8. The non-transitory computer-readable storage medium of claim 7, wherein the storing the handwriting information on the third layer includes storing data of the handwriting information on the third layer into the storage, in association with a certain document, and wherein the processes further comprise:

reading the data of the handwriting information associated with the certain document, from the storage, and operating the touch panel to display the certain document together with the handwriting information associated with the certain document, in the display area.

9. The non-transitory computer-readable storage medium of claim 2, wherein the processes further comprise storing the document on the first layer, the handwriting information on the second layer and the handwriting information on the third layer into a storage together as one piece of data.

10. An image display apparatus comprising:

a touch panel; and a controller configured to:

display a document in a display area of the touch panel;

accept an input of handwriting information via the touch panel;

accept a designation of a display mode as one of a first display mode and a second display mode;

add display mode designation information to the handwriting information, to designate the handwriting information as handwriting information designated to be displayed in the first display mode or as handwriting information designated to be displayed in the second display mode, in accordance with the designated display mode;

display the handwriting information in the display area; and in response to detecting an input operation to change the display of the document displayed in the display area, (i) change the display of the document in accordance with the input operation, (ii) control the display of the handwriting information designated to be displayed in the first display mode such that the display of the handwriting information is changed in a same manner as the display of the document, and (iii) control the display of the handwriting information designated to be displayed in the second display mode such that a display state of the handwriting information is maintained even if the input operation is one of a page turning operation which turns a page of the document in the display area, a movement operation which moves the displayed content in the display area, an enlargement operation which enlarges the displayed content in the display area, and a reduction operation which reduces the displayed content in the display area.

11. A display control method of an apparatus comprising a touch panel, the method comprising:

displaying a document in a display area of the touch panel;
accepting an input of handwriting information via the touch panel;
accepting a designation of a display mode as one of a first display mode and a second display mode;
adding display mode designation information to the handwriting information, to designate the handwriting information as handwriting information designated to be displayed in the first display mode or as handwriting information designated to be displayed in the second display mode, in accordance with the designated display mode;
displaying the handwriting information in the display area; and
in response to detecting an input operation to change the display of the document displayed in the display area, (i) changing the display of the document in accordance with the input operation, (ii) controlling the display of the handwriting information designated to be displayed in the first display mode such that the display of the handwriting information is changed in a same manner as the display of the document, and (iii) controlling the display of the handwriting information designated to be displayed in the second display mode such that a display state of the handwriting information is maintained even if the input operation is one of a page turning operation which turns a page of the document in the display area, a movement operation which moves the displayed content in the display area, an enlargement operation which enlarges the displayed content in the display area, and a reduction operation which reduces the displayed content in the display area.

12. The display control method of claim 11, further comprising:
assigning an image of the document to a first layer;
assigning an image of the handwriting information designated to be displayed in the first display mode, to a second layer;
assigning an image of the handwriting information designated to be displayed in the second display mode, to a third layer; and
displaying the first layer, the second layer, and the third layer such that the first, second, and third layers overlap in the display area, thereby displaying the document in the display area and displaying the handwriting information in the display area.

13. The display control method of claim 12, further comprising, in response to receiving a designation of a region of the document on the first layer, assigning an image of the document within the region or an image of the document outside the region, to the third layer.

14. The display control method of claim 12, further comprising, in response to receiving a designation of a region of the handwriting information on the second layer, assigning an image of the handwriting information within the region or an image of the handwriting information outside the region, to the third layer.

15. The display control method of claim 12, wherein the controlling the display of the handwriting information designated to be displayed in the second display mode comprises, upon the document on the first layer moving relative to the display area, maintaining a location of the handwriting information on the third layer relative to the display area.

16. The display control method of claim 12, further comprising, upon the handwriting information on the third layer moving relative to the display area, maintaining a location of the document on the first layer relative to the display area.

17. The display control method of claim 12, further comprising storing the handwriting information on the third layer into a storage, as data separated from the document on the first layer.

18. The display control method of claim 17, wherein the storing the handwriting information on the third layer includes storing data of the handwriting information on the third layer into the storage, in association with a certain document, and
wherein the display control method further comprises:
reading the data of the handwriting information associated with the certain document, from the storage, and
operating the touch panel to display the certain document together with the handwriting information associated with the certain document, in the display area.

19. The display control method of claim 12, further comprising storing the document on the first layer, the handwriting information on the second layer, and the handwriting information on the third layer into a storage together as one piece of data.

* * * * *